US012459276B2

(12) United States Patent
Hatta et al.

(10) Patent No.: US 12,459,276 B2
(45) Date of Patent: Nov. 4, 2025

(54) CONTACT MEMBER, DRYING APPARATUS, AND PRINTING APPARATUS FOR TREATING LIQUID-COATED SUBSTRATES

(71) Applicants: Chikako Hatta, Kanagawa (JP); Yuuki Mizutani, Kanagawa (JP)

(72) Inventors: Chikako Hatta, Kanagawa (JP); Yuuki Mizutani, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 149 days.

(21) Appl. No.: 18/554,175

(22) PCT Filed: Apr. 15, 2022

(86) PCT No.: PCT/JP2022/017965
§ 371 (c)(1),
(2) Date: Oct. 5, 2023

(87) PCT Pub. No.: WO2022/224915
PCT Pub. Date: Oct. 27, 2022

(65) Prior Publication Data

US 2024/0253370 A1 Aug. 1, 2024

(30) Foreign Application Priority Data

Apr. 21, 2021 (JP) ................................ 2021-071698
Feb. 28, 2022 (JP) ................................ 2022-028908

(51) Int. Cl.
*B41J 11/44* (2006.01)
*B41J 11/00* (2006.01)
*C09D 11/30* (2014.01)

(52) U.S. Cl.
CPC .......... *B41J 11/44* (2013.01); *B41J 11/00244* (2021.01); *B41J 11/007* (2013.01); *C09D 11/30* (2013.01)

(58) Field of Classification Search
CPC ..... B41J 11/44; B41J 11/00244; B41J 11/007; B41J 13/076; B41J 11/0024; C09D 11/30; C25D 11/16; C25D 11/08
See application file for complete search history.

(56) References Cited

U.S. PATENT DOCUMENTS

2012/0155919 A1* 6/2012 Cardoso ................ C25D 11/16 399/333
2020/0307246 A1 10/2020 Hatta et al.
(Continued)

FOREIGN PATENT DOCUMENTS

JP 57100459 A * 6/1982 ......... G03G 15/2057
JP S57-100459 6/1982
(Continued)

OTHER PUBLICATIONS

International Search Report for PCT/JP2022/017965 mailed on Jul. 8, 2022.
(Continued)

*Primary Examiner* — Bradley W Thies
(74) *Attorney, Agent, or Firm* — Grüneberg and Myers PLLC

(57) ABSTRACT

To provide a contact member which prevents a component derived from a liquid composition, from being transferred from a contacted member to a contact member, even in a case where the contact member and the contacted member are used for a long period of time in a manner of being in contact with each other (Means of Achieving the object) A contact member configured to contact a contacted member to which a liquid composition is applied, includes a surface layer (A) configured to contact the contacted member, wherein the surface layer (A) includes a support layer including alumite sulfate, the surface layer (A) has a root mean square height Sq of 1.0 μm or more, and the surface
(Continued)

layer (A) has an orthogonal line roughness ratio of 0.7 or more.

15 Claims, 5 Drawing Sheets

(56) References Cited

U.S. PATENT DOCUMENTS

| | | | |
|---|---|---|---|
| 2020/0338905 | A1 | 10/2020 | Mizutani et al. |
| 2021/0009824 | A1 | 1/2021 | Miyakoshi et al. |
| 2022/0106490 | A1 | 4/2022 | Hatta et al. |
| 2022/0371336 | A1 | 11/2022 | Mizutani et al. |

FOREIGN PATENT DOCUMENTS

| | | | |
|---|---|---|---|
| JP | S61-072273 | | 4/1986 |
| JP | H08-259071 | | 10/1996 |
| JP | H09-114294 | | 5/1997 |
| JP | 3210611 | | 9/2001 |
| JP | 2004-205668 | | 7/2004 |
| JP | 2004-255688 | A | 9/2004 |
| JP | 4128258 | | 7/2008 |
| JP | 2019-007471 | | 1/2019 |
| JP | 2019-163162 | A | 9/2019 |
| JP | 6641990 | | 2/2020 |
| JP | 2020-143189 | | 9/2020 |
| JP | 2020-147647 | | 9/2020 |
| JP | 2021-014574 | | 2/2021 |
| JP | 2021-190183 | | 12/2021 |
| JP | 2022-061609 | | 4/2022 |
| JP | 2022-177900 | | 12/2022 |

OTHER PUBLICATIONS

Kuga Shigenori, "DSA", Japan Technical Association of the Pulp and Paper Industry Journal, vol. 48, May 1994, pp. 88-92, with partial English translation.

Office Action issued in Japanese Patent Application No. 2022-028908 dated Sep. 9, 2025, 3 pages.

* cited by examiner

[Fig. 1]
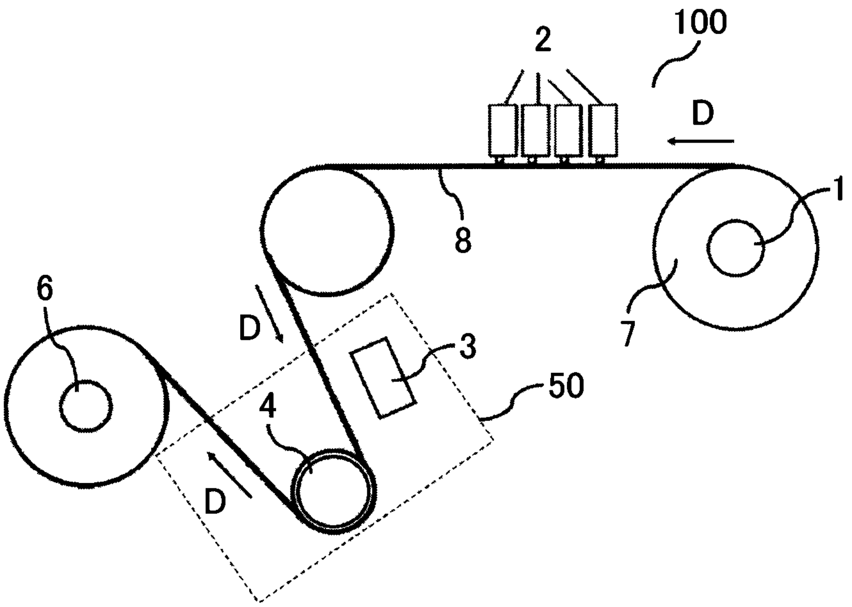
[Fig. 2]
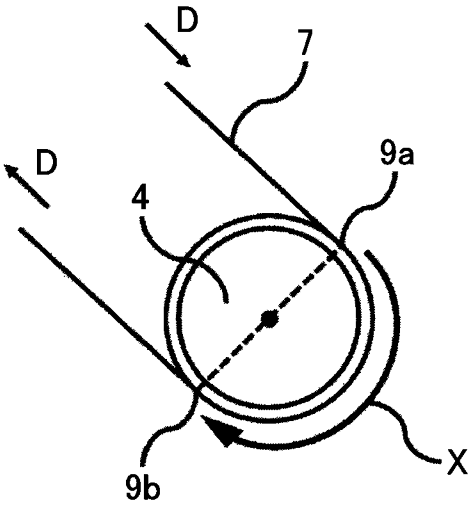

[Fig. 3]
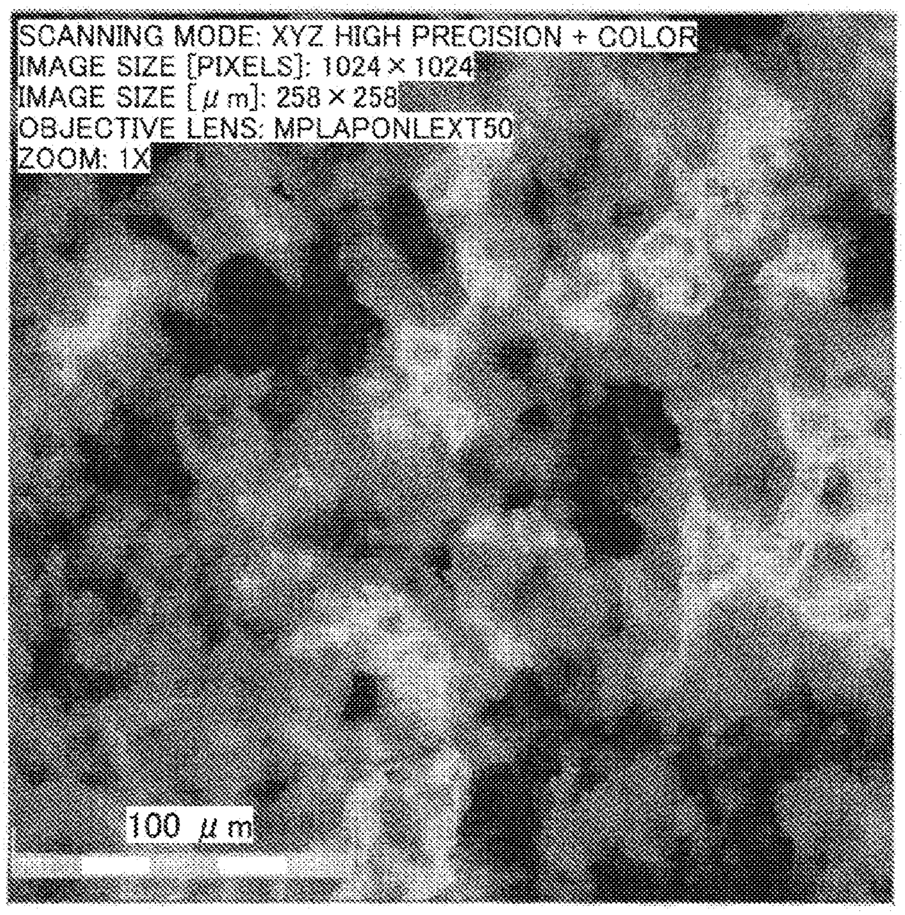

[Fig. 4]
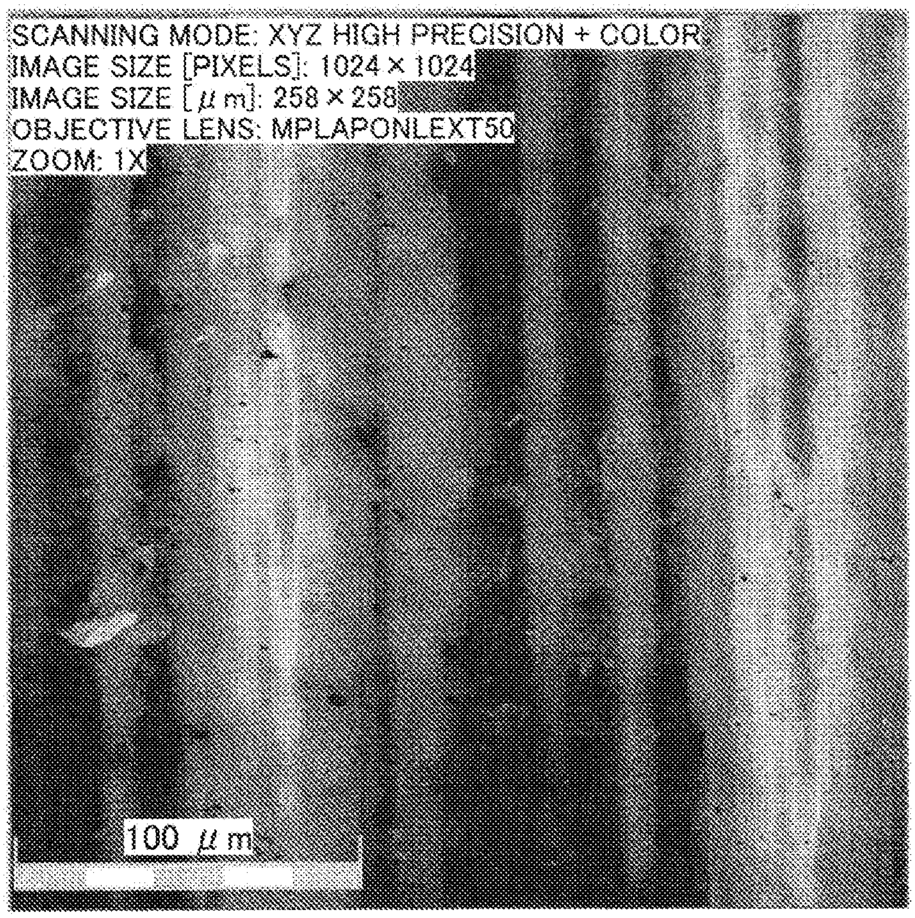
[Fig. 5]
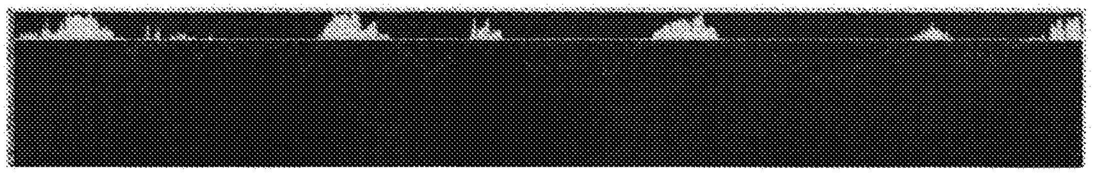

[Fig. 6]
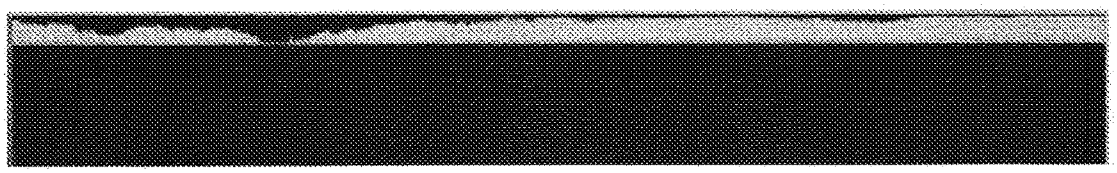
[Fig. 7]
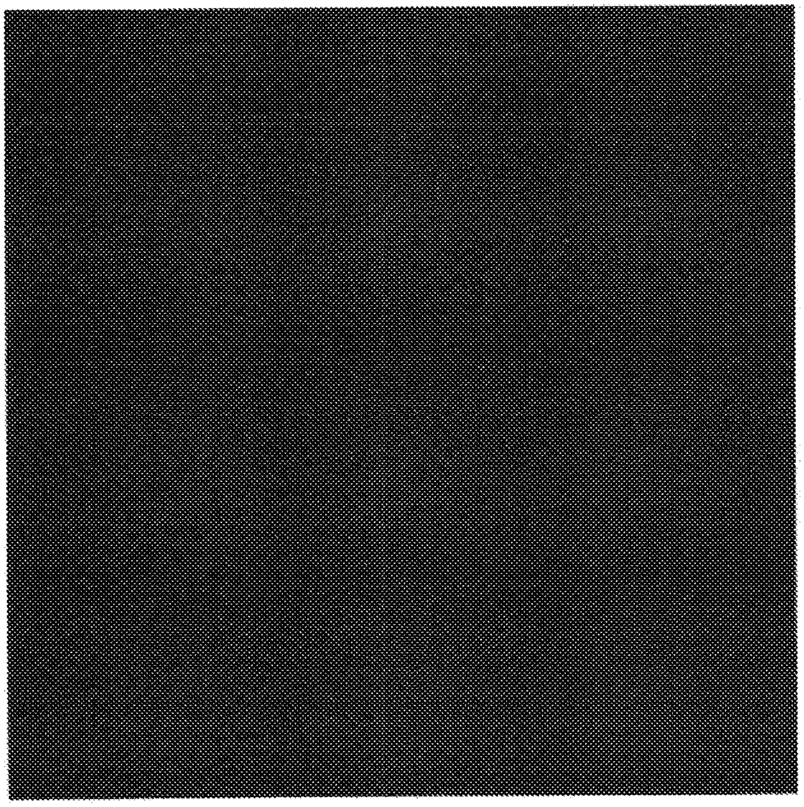

[Fig. 8]
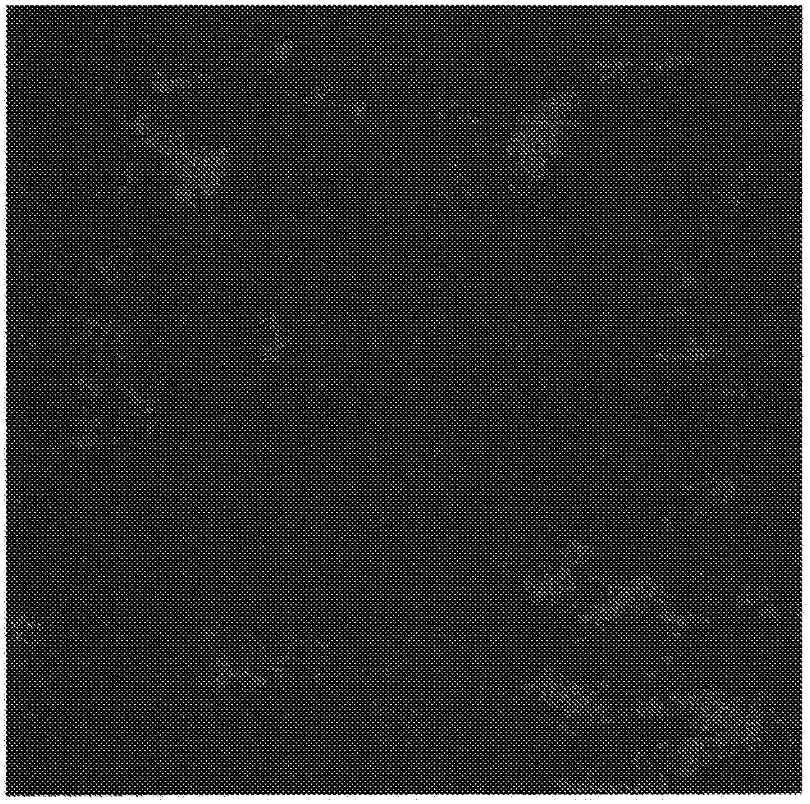

CONTACT MEMBER, DRYING APPARATUS, AND PRINTING APPARATUS FOR TREATING LIQUID-COATED SUBSTRATES

TECHNICAL FIELD

The present invention relates to a contact member, a drying apparatus, and a printing apparatus.

BACKGROUND ART

Inside a printing apparatus such, as an inkjet device, there is provided is a conveying member for conveying a recording medium such as a continuous form sheet and a cut sheet. The conveying member directs the recording medium to a means for applying a liquid composition, such as ink, and to a means for heating and drying the applied liquid composition.

In recent years, for the purpose of providing a highly productive water-repellent base material capable of maintaining super water-repellent properties, there is proposed a water-repellent base material including an aluminum base material, an alumite layer disposed on a surface of the aluminum base material, and a water-repellent coating disposed on the surface of the alumite layer, wherein the alumite layer has a base layer integrally provided with the aluminum base material and has an irregular structure formed of multiple pin-shaped protrusions standing in parallel on the surface of the base layer (see, for example, Patent Document 1).

Further, for the purpose of solving the problem of cracking, preventing the occurrence of image failures, and providing an image forming apparatus including a heating roll that can be used for a long time, there is proposed a fixing device in an image forming apparatus for fixing an unfixed toner image on a recording medium by using a heating roll provided with an alumite film having fine pores (see, for example, Patent Document 2).

CITATION LIST

Patent Literature

PTL 1: Japanese Patent No. 6641990
PTL 2: Japanese Laid-Open Patent Application No. H9-114294

SUMMARY OF INVENTION

Technical Problem

The disclosed technology is thus intended to provide a contact member which prevents a component derived from a liquid composition, from being transferred from a contacted member to the contact member, even in a case where the contact member and the contacted member are used for a long period of time in a manner of being in contact with each other.

Solution to Problem

According to an aspect of the present invention, a contact member configured to contact a contacted member to which a liquid composition is applied, includes a surface layer (A) configured to contact the contacted member, wherein the surface layer (A) includes a support layer including alumite sulfate, the surface layer (A) has a root mean square height Sq of 1.0 μm or more, and the surface layer (A) has an orthogonal line roughness ratio of 0.7 or more.

Advantageous Effects of Invention

According to an embodiment of the present invention, a contact member is provided, which prevents a component derived from a liquid composition, from being transferred from a contacted member to the contact member, even in a case where the contact member and the contacted member are used for a long period of time in a manner of being in contact with each other.

BRIEF DESCRIPTION OF DRAWINGS

FIG. 1 is a schematic diagram illustrating an example of a printing apparatus using continuous paper.

FIG. 2 is a schematic diagram illustrating a contacted member in contact with a contact member.

FIG. 3 is an image illustrating the height of surface layer (A) of example 1.

FIG. 4 is an image illustrating the height of the surface layer (A) of comparative example 2.

FIG. 5 is an image illustrating the height profile of the cross-section of the surface layer (A) of example 1.

FIG. 6 is an image illustrating the height profile of the cross-section of the surface layer (A) of comparative example 1.

FIG. 7 is an image illustrating the shape of the transfer portion when the contact member of example 1 is used.

FIG. 8 is an image illustrating the shape of the transfer portion when the contact member of comparative example 1 is used.

DESCRIPTION OF EMBODIMENTS

With respect to a conventional conveying member used in an image forming apparatus or the like, when the conveying member is in direct contact with a region to which a liquid composition is applied, transfer of the liquid composition to the conveying member has resulted in a failure in some cases. This transfer of the liquid composition to such a conveying member is known to become significant when slow-drying ink, such as aqueous ink or ink including a low volatility solvent as the primary component, is used as the liquid composition.

Further, in the aforementioned Patent Documents 1 to 2, which are conventional technology, when the contact member in contact with a contacted member to which the liquid composition is applied, are used for a long period of time in a manner in which the contact member is in contact with the contacted member, there has been a problem in that a component derived from the liquid composition is transferred from the contacted member to the contact member.

As a result of intensive investigation, the inventors of the present invention have found that it is possible to prevent a component derived from the liquid composition from being transferred from the contacted member to the contact member, by providing the contact member, which contacts the liquid composition, with a surface layer (A) having a support layer including alumite sulfate, and by adjusting the root mean square height Sq and the orthogonal line roughness ratio of the surface layer (A).

Accordingly, in the present invention, it is possible to obtain a contact member that contacts a contacted member on which a liquid composition is applied, in which a component derived from the liquid composition is prevented from being transferred from the contacted member to the contact member, even in a case where the contact member and the contacted member are used for a long period of time in a manner of being in contact with each other, wherein the contact member has a surface layer (A) in contact with the contacted member, the surface layer (A) has a support layer including alumite sulfate, and the root mean square height Sq of the surface layer (A) is 1.0 μm or more, and the orthogonal line roughness ratio of the surface layer (A) is 0.7 or more.

Hereinafter, the present invention will be described.

(Contact Member)

The contact member of the present invention that contacts a contacted member to which a liquid composition is applied, has a surface layer (A) that contacts the contacted member, and may have a base material, heating means (heating unit), other members, and the like, according to need.

Preferably, the surface layer (A) is provided on a base material as described below.

The contact member may be a member (hereinafter, also referred to as a conveying member) that conveys the contacted member by contacting the contacted member described below, or a member (hereinafter, also referred to as a non-conveying member) that does not convey the contacted member.

When the contact member is a conveying member, the form of the conveying member is not particularly limited and can be suitably selected according to the purpose. For example, the shape of the contact member is roller-shaped, and the contact member rotates to convey the contacted member.

When the contact member is a non-conveying member, the form of the non-conveying member is not particularly limited and may be suitably selected according to the purpose. For example, the contact member may be in the form of a plate, and may heat or press a contacted member while contacting the contacted member. Examples of the non-conveying member include iron, platen, and the like.

<Surface Layer (A)>

The surface layer (A) according to an embodiment of the present invention is a layer in contact with the contacted member, and has a support layer including alumite sulfate, and has features of a predetermined shape surface as described below.

It is preferable that the surface layer (A) has fluorine resin particles adhering to the support layer, which will be described later.

<<Root Mean Square Height Sq>>

The root mean square height Sq of the surface layer (A) in the present invention is 1.0 μm or more.

The root mean square height Sq of the surface layer (A) is preferably 1.0 μm or more and 10.0 μm or less, more preferably 1.0 μm or more and 9.0 μm or less, and further preferably 1.0 μm or more and 8.0 μm or less.

The root mean square height Sq of the surface layer (A) is 1.0 μm or more, which is suitable because the contact area between the surface layer (A) and the contacted member is reduced, and transfer of the component derived from the liquid composition from the contacted member to the contact member can be prevented.

The root mean square height Sq of the surface layer (A) is 10.0 μm or less, thereby causing the thermal conductivity of the contact member with respect to the contacted member to be increased, and, therefore, it is effective when the contact member is used as a contact member having the heating means described later.

In the present disclosure, the "component derived from a liquid composition" may be the liquid composition per se, which will be described later, or a partial component included in the liquid composition (e.g., a coloring material, which will be described later).

The method of measuring the root mean square height Sq in the surface layer (A) is not particularly limited and can be suitably selected according to the purpose. For example, there is a method in which the surface layer (A) is observed with a laser microscope (LEXT OLS4000, manufactured by Olympus Corporation) at a magnification of 20 times and is calculated in accordance with JIS B 0601:2013.

<<Orthogonal Line Roughness Ratio>>

The orthogonal line roughness ratio of the surface layer (A) in the present invention is 0.7 or more.

The orthogonal line roughness ratio of the surface layer (A) being 0.7 or more indicates that linear irregularities in a certain direction generated due to a lathing process, a polishing process, and the like, are prevented from being generated on the surface layer (A). When a contact member having linear irregularities in a certain direction on the surface layer (A) is used, the shape of the contact surface between the surface layer (A) and the contacted member becomes linear, and the contact area per contact portion becomes large, so that a component derived from the liquid composition is easily transferred from the contacted member to the contact member. Then, the transfer region on the contacted member becomes linear, and, therefore, the region is more visible and is easily recognized as a failure on the contacted member. On the other hand, when the orthogonal line roughness ratio of the surface layer (A) is 0.7 or more, and the root mean square height Sq of the surface layer (A) is 1.0 μm or more, the shape of the contact surface between the surface layer (A) and the contact member becomes dot-shaped, and the contact area per contact portion is reduced, so that the component derived from the liquid composition is less likely to be transferred from the contacted member to the contact member. Further, even when a transfer occurs, the transfer region of the contacted member are dots in which the generation cycle is not constant, and, therefore, the visibility of the region is reduced, and is thus not appreciably recognized as a failure on the contacted member.

The method of measuring the orthogonal line roughness ratio of the surface layer (A) is not particularly limited and can be suitably selected according to the purpose. For example, the following method may be used.

First, any point on the surface layer (A) is defined as the measurement center point, and the line roughness of the surface layer (A) in any direction from the measurement center point is measured with a laser microscope (LEXT OLS4000, manufactured by Olympus Corporation) at a magnification of 20 times and a measurement length of 260 μm. Next, the line roughness in the measurement direction in which the line roughness is minimal and the line roughness in the direction perpendicular to the measurement direction in which the line roughness is minimal are obtained. Further, a new measurement center point at a 100 μm interval in a certain direction from the aforementioned measurement center point is defined, and the line roughness in the measurement direction in which the line roughness is minimal and the line roughness in the direction perpendicular to the measurement direction in which the line roughness is minimal are obtained, in the same manner as the measurement at the aforementioned measurement center point. A total of five measurements with respect to the measurement center point are performed, and the average Ra(Min.)

of the line roughness in the measurement direction in which the line roughness is the minimal, and the average) Ra(90° of the line roughness in the direction perpendicular to the measurement direction in which the line roughness is the minimal, are obtained. Then, the ratio <Ra(Min.)/Ra(90°)> of Ra(Min.) to Ra(90°) is calculated to obtain the orthogonal line roughness ratio.

The ratio of the area where the surface layer (A) and the contacted member are in contact with each other, with respect to the area of the surface layer (A), is preferably 10% or more and 90% or less, more preferably 10% or more and 80% or less, further preferably 10% or more and 50% or less, and particularly preferably 10% or more and 40% or less.

Note herein that "the area of the surface layer (A)" may be referred to as "the observed area", "the area where the surface layer (A) and the contacted member are in contact with each other" may be is referred to as "the contact area", and "the ratio of the area where the surface layer (A) and the contacted member are in contact with each other, to the area of the surface layer (A)" may be referred to as "the contact area ratio".

If the contact area ratio is 90% or less, the contact area is reduced, and transfer of component derived from the liquid composition from the contacted member to the contact member can be prevented, and thus is suitable.

If the contact area ratio is 10% or more, the thermal conductivity of the contact member to the contacted member is increased. Therefore, this is effective in a case where the contact member is used as a contact member having the heating means described below.

As the method of measuring the contact area ratio, there is no particular limit, and the method can be suitably selected according to the purpose. For example, the following method may be used.

First, the surface layer (A) is observed with a laser microscope (LEXT OLS4000, manufactured by Olympus Corporation) at a magnification of 20 times to obtain the height profile. Next, the contact area is obtained, which is a cross-sectional area formed when the contact member is cut at a plane parallel to the surface layer (A) at a depth of 5 μm from the maximum height (the top surface of the surface layer (A)), in the acquired height profile. Then, the ratio of the contact area with respect to the observed area (contact area/observed area) is calculated, to obtain the contact area ratio.

In the surface layer (A) according to an embodiment of the present invention, the above-described method of obtaining the square root mean square height Sq, the orthogonal line roughness ratio, and the contact area ratio is not particularly limited, but there is a method in which the base material described below is subjected to blasting or the like as preprocessing performed prior to the alumite sulfate process described below. A double irregular shape forming process is performed, in which irregular shapes are randomly formed on the surface of a base material by a blasting process, and the irregular shapes are further formed while generating a support layer including alumite sulfate by an alumite sulfate process. Accordingly, it is easy to make the root mean square height Sq of the surface layer (A) to be 1.0 μm or more, to make the orthogonal line roughness ratio of the surface layer (A) to be 0.7 or more, and to make the contact area ratio to be 10% or more and 90% or less.

The type of blasting agent in the blasting process is not particularly limited and may be suitably selected according to the purpose, for example, glass beads (soda lime glass), alumina beads, stainless steel beads, zirconia beads, and the like may be used. Of these, glass beads and alumina beads are preferable from the viewpoint of hardness.

The form of the blasting agent is not particularly limited and may be suitably selected according to the purpose. For example, a blasting agent having shapes such as spherical shapes, polygonal shapes, cylindrical shapes, or the like may be suitably used.

The particle diameter of the blasting agent is not particularly limited, and may be suitably selected according to the purpose. For example, it is preferable that the central particle diameter is 50 μm or more and 1000 μm or less.

The count of the blasting agent is not particularly limited and may be suitably set according to the purpose. However, it is preferable that the count of the blasting agent is less than 100 from the viewpoint of reducing the drying energy for preventing the transfer of the component derived from the liquid composition from the contacted member to the contact member.

<Support Layer>

The support layer according to an embodiment of the present invention includes a layer including alumite sulfate as the constituent material (i.e., an alumite sulfate coating) and may include other constituent materials according to need.

Herein, "including alumite sulfate" means including a material derived from an alumite sulfate process, and "an alumite sulfate process" means the anodization of aluminum in an aqueous sulfuric acid solution. That is, the layer including the material derived from the alumite sulfate process is a layer including aluminum oxide and in which a sulfur component is detected.

Here, "the sulfur component is detected" means, for example, that data indicating the presence of the sulfur component is obtained when mapping the sulfur component to the cross-section of the support layer.

Methods of mapping the sulfur component are not limited and may be suitably selected according to the purpose, and include, for example, a method of performing EDS elemental analysis (UltraDry, Thermo Fisher Scientific) on the cross-section of the support layer.

When the aforementioned support layer includes alumite sulfate as the component material, the hardness of the surface layer (A) configured by the support layer is increased. Accordingly, even in a case where the contact member and the contacted member are used for a long period of time in a manner of being in contact with each other (that is, when frictional stress occurs between the contact member and the contacted member for a long period of time), the shape of the surface layer (A) can be maintained (that is, the root mean square height Sq in the surface layer (A) is maintained at 1.0 μm or more, and the orthogonal line roughness ratio in the surface layer (A) is maintained at 0.7 or more), and it is possible to provide a contact member capable of preventing, for a long period of time, a component derived from the liquid composition from being transferred from the contacted member to the contact member.

A method for confirming that a layer includes an alumite sulfate (that is, a layer includes aluminum oxide and in which sulfur content is detected) is not particularly limited and can be suitably selected according to the purpose, for example, there is a method for obtaining data indicating that a sulfur component, an aluminum component, and an oxygen component are present in the same region, when mapping of the sulfur component, an aluminum component, and an oxygen component to the cross-section of the support layer is performed respectively, or the like. Specifically, a method of mapping the sulfur, aluminum, and oxygen components, respectively, by performing an EDS elemental analysis (UltraDry, Thermo Fisher Scientific) on the cross-section of the support layer is included.

The support layer includes alumite sulfate as the constituent material as described above, such that the hardness is increased. Specifically, it is preferable that the Vickers hardness of the contact member having the support layer is 400 Hv or more and 500 Hv or less.

The Vickers hardness of the contact member is 400 Hv or more and 500 Hv or less, and, therefore, even in a case where the contact member and the contacted member are used for a long period of time in a manner of being in contact with each other (that is, when frictional stress occurs between the contact member and the contact member for a long period of time), the shape of the surface layer (A) is maintained (that is, the root mean square height Sq of the surface layer (A) is maintained at 1.0 μm or more, and the orthogonal line roughness ratio of the surface layer (A) is maintained at 0.7 or more), and it is possible to provide a contact member that prevents, for a long period of time, the transfer of a component derived from the liquid composition from the contact membered to the contact member.

As the method of measuring the Vickers hardness of the contact member, there is no particular limit, and the method can be suitably selected according to the purpose. For example, the measurement may be performed according to the test method of JIS Z 2244.

—Fluorine Resin Particles—

Preferably, the surface layer (A) according to an embodiment of the present invention includes fluorine resin particles. More specifically, it is preferable that fluorine resin particles are adhering to and supported on the surface of the supporting layer.

The surface layer (A) has fluorine resin particles, and, therefore, the fluorine resin particles increase the lubricity between the contacted member and the contact member, and it is possible to prevent the transfer of a component derived from the liquid composition from the contacted member to the contact member. Further, as described above, the surface layer (A) having the irregular shapes is provided with the fluorine resin particles, and, therefore, even when frictional stress is generated between the contact member and the contacted member, the irregular shapes prevent the fluorine resin particles from coming off, and it is possible to maintain the aforementioned effect of preventing the transfer for a long time.

The fluorine resin particles are not particularly limited and may be suitably selected according to purpose, for example, tetrafluoroethylene-perfluoroalkylvinyl ether copolymer (PFA, melting point: 300-310° C.), polytetrafluoroethylene (PTFE, melting point: 330° C.), tetrafluoroethylene-hexafluoropropylene copolymer (FEP, melting point: 250-280° C.), ethylene-tetrafluoroethylene copolymer (ETFE, melting point: 260-270° C.), polyvinylidene fluoride (PVDF, melting point: 160-180° C.), polychlorotrifluoroethylene (PCTFE, melting point: 210° C.), and tetrafluoroethylene-hexafluoropropylene-perfluoro alkylvinyl ether copolymer (EPE, melting point 290-300° C.), and mixtures including these polymers, may be used. Among these, polytetrafluoroethylene (PTFE) is preferable.

The method of causing the fluorine resin particles to adhere to the support layer is not particularly limited, and can be suitably selected according to the purpose. For example, there is a method of dipping a member having the support layer formed thereon in a dispersion liquid including the fluorine resin particles, and air-drying the dispersion liquid.

The amount of elemental fluorine in the surface layer (A) (the ratio of the amount of elemental fluorine to the total amount of elements detected in the observation range) is preferably 5.0 atm % or more, and more preferably 10.0 atm % or more, when the elemental analysis is performed.

It is suitable that the amount of elemental fluorine on the surface layer (A) is 5.0 atm % or more, because it is possible to prevent the transfer of a component derived from the liquid composition from the contacted member to the contact member.

The method of measuring the amount of elemental fluorine on the surface layer (A) is not particularly limited and can be suitably selected according to the purpose, such as a method of performing EDS elemental analysis under the following conditions.

Specifically, spectral analysis is performed under the following conditions, and the amount of elemental fluorine is obtained by performing automatic quantitation using analysis software. The same method is performed at any five points, and an average value of the obtained values is used as the amount of elemental fluorine.

Device: Scanning electron microscope Merlin manufactured by Carl Zeiss AG

EDS detector: Electronic cooling type SDD detector UltraDry manufactured by Thermo Fisher Scientific Acceleration voltage: 3.0 kV W. D.: 13.0 mm Take-off angle: 35.0 deg.

Magnification: 2,000 times

Conductive process: C-coat

Cumulative time: 10 sec.

Cumulative frequency: 100 times

Drift correction: Yes

Analysis software: NORAN System 6 manufactured by Thermo Fisher Scientific

The average thickness of the support layer is preferably 20.0 μm or more and 40.0 μm or less.

The average thickness of the support layer is 20.0 μm or more, and, therefore, the hardness of the surface layer (A) configured by the support layer is increased. Therefore, even in a case where the contact member and the contacted member are used for a long period of time in a manner of being in contact with each other (that is, when frictional stress is caused between the contact member and the contacted member for a long period of time), the shape of the surface layer (A) is maintained (that is, the root mean square height Sq of the surface layer (A) is maintained at 1.0 μm or more, and the orthogonal line roughness ratio of the surface layer (A) is maintained at 0.7 or more), and it is possible to provide a contact member that prevents, for a long period of time, the transfer of a component derived from the liquid composition from the contacted member to the contact member.

The average thickness of the support layer is 40.0 μm or less, such that the thermal conductivity of the contact member with respect to the contacted member is increased, and, therefore, it is effective when the contact member is used as a contact member having the heating means described below.

As the method of measuring the average thickness of the support layer, there is no particular limitation, and the method can be suitably selected according to the purpose. For example, the measurement can be performed as follows.

First, the sulfur component, the aluminum component, and the oxygen component are mapped on the cross-section of the contact member. Examples of methods for mapping the sulfur, aluminum, and oxygen components include a method of performing EDS elemental analysis (UltraDry, manufactured by Thermo Fisher Scientific, Inc.). Next, a region where the sulfur, aluminum, and oxygen components are all detected, is determined to be the support layer, and in the support layer, the length of a perpendicular line drawn from the surface of the support layer in the direction toward the base material is obtained. The same method is performed at any 10 locations to obtain the length of the perpendicular line in the support layer at any 10 locations, and the average value of these values is defined as the average thickness of the support layer.

<Base Material>

The contact member according to an embodiment of the present invention may be provided with a base material on the side on which the surface layer (A) does not contact the contacted member. That is, the contact member according to an embodiment of the present invention may have a base material and a surface layer (A) provided on the base material.

Preferably, the support layer is formed by performing an alumite sulfate process on the base material, in a manufacturing step of the contact member. Therefore, it is preferable that the material constituting the base material includes aluminum, it is more preferable that the material further includes magnesium, and it is further preferable that the material further includes silicon. By performing an alumite sulfate process on aluminum, the columnar growth of aluminum oxide is caused, but by also including magnesium, the growth direction of aluminum oxide can be disrupted. The resulting stress in the aluminum oxide allows the surface of the formed support layer to have more irregularities. Further, by including silicon, in the same manner as in the case of including magnesium, the growth direction of the aluminum oxide can be disrupted, and stress is generated in the aluminum oxide so that the surface of the formed support layer has more irregularities. Irregularities are suitable because the contact area between the surface layer (A) and the contacted member is reduced, and transfer of a component derived from the liquid composition from the contacted member to the contact member can be prevented. Further, irregularities are suitable because a spacer effect, which prevents the fluorine resin particles adhering to the support layer from coming off the support layer, can be achieved.

As the shape of the aforementioned base material, there is no particular limitation, and it is possible to suitably select the shape according to the purpose, for example, the base material preferably has a shape of a long metal rod, and more preferably has a roller shape, such as a column or a cylinder, whose cross-section (the cut surface perpendicular to the length direction) is circular. By making the base material have these shapes, the contact member can be used as a transport roller.

When a roller-shaped base material is used, it is preferable that the diameter of the circle of the cross-section of the contact member (the cut surface in a direction perpendicular to the length direction) is 50 mm or more and 600 mm or less.

It is suitable that the diameter of the circle of the cross-section of the contact member (the cut surface in a direction perpendicular to the length direction) is 50 mm or more, because the pressure per unit area generated between the contact member and the contacted member is reduced, and the transfer of the liquid composition is prevented.

It is suitable that the diameter of the circle of the cross-section of the contact member (the cut surface in a direction perpendicular to the length direction) is 600 mm or less, because excessive adhesion between the contact member and the contacted member is reduced, and transfer of the liquid composition is prevented.

<Heating Means>

The contact member may or may not include a heating means for applying heat to the contacted member through the surface layer (A).

The heating means is a means for applying heat to the contacted member through the surface layer (A).

When the contact member has a heating means, the contact member is preferably a member that heats and dries a liquid composition applied to the contacted member by contacting the contact member.

The heating means is not particularly limited and can be suitably selected according to the purpose. In an example of a heating means, when the shortest length between a predetermined position of the heating means and the surface layer (A) is compared with the shortest length between a predetermined position of the heating means and the contacted member, the shortest length between a predetermined position of the heating means and the surface layer (A) is shorter. In an example of a heating means, when the contact member is roller shaped, the heating means is provided inside a roller shaped base material, and heat is applied to the contacted member through the base material and the surface layer (A). As described above, the heating means is configured to apply heat to the contacted member through the surface layer (A), and, therefore, the temperature of the surface layer (A) becomes high. Generally, when the contact member is used in an environment in which the surface temperature of the contact member becomes high, the fluorine resin particles soften and tend to detach from the contact member surface. However, when the fluorine resin particles are adhering on the support layer having irregularities as in the present embodiment, as described above, the fluorine resin particles are prevented from detaching, and the effect of preventing a component derived from the liquid composition from being transferred from the contacted member to the contact member, is maintained.

The form in which the heating means is provided in the contact member according to an embodiment of the present invention is not particularly limited and may be suitably selected according to the purpose, but is preferably integrally provided with other members constituting the contact member such as the surface layer (A) and the base material.

Examples of the heating means are not limited, and various publicly known means may be used, for example, means for generating a heater and hot air may be used.

When the contact member includes the heating means, it is preferable that the temperature of the surface layer (A) is 70° C. or more and 260° C. or less.

When the temperature of the surface layer (A) is 70° ° C. or more, the liquid composition applied to the contacted member can be efficiently dried, and is thus suitable.

When the temperature of the surface layer (A) is 260° C. or less, the denaturation of the fluorine resin particles can be prevented, and is thus suitable.

<Liquid Composition>

The liquid composition according to an embodiment of the present invention is not particularly limited and may be selected according to purpose, and includes, for example, ink, a preprocess solution applied in order to agglutinate the color material in the ink, s post-process solution applied to protect the surface of applied ink, and a liquid for forming an electrical circuit or the like including dispersed inorganic particles, such as metal particles, and the like. These can be used by any publicly known composition.

<<Ink>>

The ink is not particularly limited and may be suitably selected according to the purpose. However, the ink preferably includes an organic solvent, water, a coloring material, resin, wax, an additive, and the like.

—Organic Solvent—

As the organic solvent, there is no particular limitation, and the organic solvent can be suitably selected according to the purpose. For example, a water-soluble organic solvent, other organic solvents, or the like can be suitably used.

Examples of the water-soluble organic solvent include ethers such as polyvalent alcohols, polyvalent alcohol alkyl ethers, and polyvalent alcohol aryl ethers, nitrogen-containing heterocyclic compounds, amides, amines, sulfur-containing compounds, and the like.

Examples of the polyvalent alcohols are ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerine, 1,2,6-hexanetriol, 2-ethyl-1,3-hexanediol, ethyl-1,2,4-butanetriol, 1,2,3-butanetriol, 2,2,4-trimethyl-1,3-pentanediol, petriol, and the like.

Specific examples of the aforementioned polyvalent alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and the like.

Specific examples of the aforementioned polyvalent alcohol aryl ethers are ethylene glycol monophenyl ether, ethylene glycol monobenzyl ether, and the like.

Specific examples of the aforementioned nitrogen-containing heterocyclic compounds include 2-pyrrolidone, N-methyl-2-pyrrolidone, N-hydroxyethyl-2-pyrrolidone, 1,3-dimethyl-2-imidazolidinone, ε-caprolactam, γ-butyrolactone, and the like.

Specific examples of the aforementioned amides include formamide, N-methylformamide, N,N-dimethylformamide, 3-methoxy-N,N-dimethylpropionamide, 3-butoxy-N,N-dimethylpropionamide, and the like.

Specific examples of the aforementioned amines include monoethanolamine, diethanolamine, triethylamine, and the like.

Specific examples of the aforementioned sulfur-containing compounds are dimethyl sulfoxide, sulfolane, thiodiethanol, and the like.

Specific examples of the aforementioned other organic solvents include propylene carbonate, ethylene carbonate, and the like.

As the organic solvent, in addition to the above-described examples, polyol compounds having 8 or more carbons and glycol ether compounds may be suitably used.

Specific examples of the aforementioned polyol compounds having 8 or more carbons include 2-ethyl-1,3-hexanediol, 2,2,4-trimethyl-1,3-pentanediol and the like.

Specific examples of the aforementioned glycol ether compounds include polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and the like; polyvalent alcohol aryl ethers such as ethylene glycol monophenyl ether, ethylene glycol monobenzyl ether, and the like.

When the ink includes resin, the organic solvent is preferably N,N-dimethyl-ß-butoxypropionamide, N,N-dimethyl-ß-ethoxypropionamide, 3-ethyl-3-hydroxymethyloxctane, propylene glycol monomethylether. One of these kinds may be used alone or two or more kinds may be used in combination. Among these, amide solvents such as 3-butoxy-N,N-dimethylpropionamide, 3-methoxy-N,N-dimethylpropionamide, and the like, are more preferable from the viewpoint of promoting the film-forming properties of the resin and developing high sliding resistance.

It is preferable that the boiling point of the organic solvent is 180° C. or more and 250° C. or less.

When the boiling point of the organic solvent is 180° C. or more, the evaporation rate when the solvent is dried can be suitably adjusted, and levelling is sufficiently carried out so that the surface irregularities are reduced. Therefore, it is possible to increase the glossiness.

If the boiling point of the organic solvent is 250° C. or less, the problems of low drying properties and the requirement of a long drying time can be eliminated. Long drying time is undesirable as the drying time of ink is limited and drying time needs to be reduced in accordance with the acceleration in the printing technology in recent years.

The content of the organic solvent in the ink is not particularly limited, and can be suitably set according to the purpose. However, from the viewpoint of drying properties and discharge reliability of the ink, with respect to the total amount of the ink, it is preferable that the content of the organic solvent is 10% by mass or more and 60% by mass or less, and it is more preferable that the content of the organic solvent is 20% by mass or more and 60% by mass or less.

The content of the amide in the ink is not particularly limited, and can be suitably set according to the purpose. However, with respect to the total amount of the ink, it is preferable that the content of the amide is 0.05% by mass or more and 10% by mass or less, and it is more preferable that the content of the amide is 0.1% by mass or more and 5% by mass or less.

—Water—

The content of water included in the ink is not particularly limited and may be suitably set according to the purpose. However, from the viewpoint of drying properties and discharge reliability of the ink, with respect to the total amount of the ink, it is preferable that the content of water is 10% by mass or more and 90% by mass or less, and it is more preferable that the content of water is 20% by mass or more and 60% by mass or less.

—Coloring Material—

The coloring material is not particularly limited and may be suitably selected according to the purpose. A pigment (A) and dye may be used.

—Pigment (A)—

As the pigment (A), an inorganic pigment or an organic pigment may be used. One of these kinds may be used alone or two or more kinds may be used in combination. Mixed crystals may be used as the pigment (A).

As the aforementioned pigment (A), there is no particular limitation and the pigment (A) can be suitably selected according to the purpose, for example, a black pigment, a yellow pigment, a magenta pigment, a cyan pigment, a white pigment, a green pigment, an orange pigment, a glossy pigment such as gold or silver, a metallic pigment, or the like may be used.

The inorganic pigment is not particularly limited and may be suitably selected according to the purpose, for example, titanium oxide, iron oxide, calcium carbonate, barium sulfate, aluminum hydroxide, barium yellow, cadmium red, chromium yellow, as well as carbon black manufactured by publicly known methods such as a contact method, a furnace method, a thermal method, and the like may be used.

The organic pigments are not particularly limited and can be suitably selected according to the purpose, and can include azo pigments, polycyclic pigments (e.g., phthalocyanine pigments, perylene pigments, perinone pigments, anthraquinone pigments, quinacridone pigments, dioxazine pigments, indigo pigments, thioingigo pigments, isoindolinone pigments, quinophthalone pigments, and the like), dye chelates (e.g., basic dye chelates, acid dye chelates, and the like), nitro pigments, nitroso pigments, aniline black, and the like.

Of these pigments (A), those having a good affinity with solvent are preferably used. Further, resin hollow particles and inorganic hollow particles may be used.

Examples of the aforementioned pigment (A) include, for black use, carbon black (C.I. Pigment Black 7) such as furnace black, lamp black, acetylene black, channel black, and the like, metals such as copper, iron (C.I. Pigment Black 11), titanium oxide, and organic pigments such as aniline black (C.I. Pigment Black 1).

Examples of the pigment (A) include, for color use, C.I. Pigment Yellow 1, C.I. Pigment Yellow 3, C.I. Pigment Yellow 12, C.I. Pigment Yellow 13, C.I. Pigment Yellow 14, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxide), C.I. Pigment Yellow 53, C.I. Pigment Yellow 55, C.I. Pigment Yellow 74, C.I. Pigment Yellow 81, C.I. Pigment Yellow 83, and C.I. Pigment Yellow 95, C.I. Pigment Yellow 97, C.I. Pigment Yellow 98, C.I. Pigment Yellow 100, C.I. Pigment Yellow 101, and C.I. Pigment Yellow 104, C.I. Pigment Yellow 108, C.I. Pigment Yellow 109, C.I. Pigment Yellow 110, C.I. Pigment Yellow 117, C.I. Pigment Yellow 120, C.I. Pigment Yellow 138, C.I. Pigment Yellow 150, C.I. Pigment Yellow 153, C.I. Pigment Yellow 155, C.I. Pigment Yellow 180, C.I. Pigment Yellow 185, C.I. Pigment Yellow 213, C.I. Pigment Orange 5, C.I. Pigment Orange 13, C.I. Pigment Orange 16, C.I. Pigment Orange 17, C.I. Pigment Orange 36, C.I. Pigment Orange 43, C.I. Pigment Orange 51, C.I. Pigment Red 1, C.I. Pigment Red 2, C.I. Pigment Red 3, C.I. Pigment Red 5, C.I. Pigment Red 17, C.I. Pigment Red 22, C.I. Pigment Red 23, C.I. Pigment Red 31, C.I. Pigment Red 38, C.I. Pigment Red 48:2, C.I. Pigment Red 48:2 (Permanent Red 2B (Ca)), C.I. Pigment Red 48:3, C.I. Pigment Red 48:4, C.I. Pigment Red 49:1, C.I. Pigment Red 52:2, C.I. Pigment Red 53:1, C.I. Pigment Red 57:1 (Brilliant Carmin 6B), C.I. Pigment Red 60:1, C.I. Pigment Red 63:1, C.I. Pigment Red 63:2, C.I. Pigment Red 64:1, C.I. Pigment Red 81, C.I. Pigment Red 83, C.I. Pigment Red 88, C.I. Pigment Red 101 (Red Iron Oxide), C.I. Pigment Red 104, C.I. Pigment Red 105, C.I. Pigment Red 106, C.I. Pigment Red 108 (cadmium red), C.I. Pigment Red 112, C.I. Pigment Red 114, C.I. Pigment Red 122 (quinacridone magenta), C.I. Pigment Red 123, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 184, C.I. Pigment Red 185, C.I. Pigment Red 190, C.I. Pigment Red 193, C.I. Pigment Red 202, C.I. Pigment Red 207, C.I. Pigment Red 208, C.I. Pigment Red 209, C.I. Pigment Red 213, C.I. Pigment Red 219, C.I. Pigment Red 224, C.I. Pigment Red 254, C.I. Pigment Red 264, C.I. Pigment Violet 1 (Rhodamine Lake), C.I. Pigment Violet 3, 5:1, C.I. Pigment Violet 16, C.I. Pigment Violet 19, C.I. Pigment Violet 23, C.I. Pigment Violet 38, C.I. Pigment Blue 1, C.I. Pigment Blue 2, C.I. Pigment Blue 15 (phthalocyanine blue), C.I. Pigment Blue 15:1, C.I. Pigment Blue 15:2, C.I. Pigment Blue 15:3, C.I. Pigment Blue 15:4 (phthalocyanine blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18, and C.I. Pigment Green 36.

—Dye—

The dye is not particularly limited and can be suitably selected according to the purpose, and acidic dyes, direct dyes, reactive dyes, and basic dyes can be used. One of these kinds may be used alone or two or more kinds may be used in combination.

Specific examples of the dyes are C.I. Acid Yellow 17, C.I. Acid Yellow 23, C.I. Acid Yellow 42, C.I. Acid Yellow 44, C.I. Acid Yellow 79, C.I. Acid Yellow 142, C.I. Acid Red 52, C.I. Acid Red 80, C.I. Acid Red 82, C.I. Acid Red 249, C.I. Acid Red 254, C.I. Acid Red 289, C.I. Acid Blue 9, C.I. Acid Red 45, C.I. Acid Red 249, C.I. Acid Black 1, C.I. Acid Black 2, C.I. Acid Black 24, C.I. Acid Black 94, C.I. Food Black 1, C.I. Food Black 2, C.I. Direct Yellow 1, C.I. Direct Yellow 12, C.I. Direct Yellow 24, C.I. Direct Yellow 33, C.I. Direct Yellow 50, C.I. Direct Yellow 55, C.I. Direct Yellow 58, C.I. Direct Yellow 86, C.I. Direct Yellow 132, C.I. Direct Yellow 142, C.I. Direct Yellow 144, C.I. Direct Yellow 173, C.I. Direct Red 1, C.I. Direct Red 4, C.I. Direct Red 9, C.I. Direct Red 80, C.I. Direct Red 81, C.I. Direct Red 225, C.I. Direct Red 227, C.I. Direct Blue 1, C.I. Direct Blue 2, C.I. Direct Blue 15, C.I. Direct Blue 71, C.I. Direct Blue 86, C.I. Direct Blue 87, C.I. Direct Blue 98, C.I. Direct Blue 165, C.I. Direct Blue 199, C.I. Direct Blue 202, C.I. Direct Black 19, C.I. Direct Black 38, C.I. Direct Black 51, C.I. Direct Black 71, C.I. Direct Black 154, C.I. Direct Black 168, C.I. Direct Black 171, C.I. Direct Black 195, C.I. Reactive Red 14, C.I. Reactive Red 32, C.I. Reactive Red 55, C.I. Reactive Red 79, C.I. Reactive Red 249, C.I. Reactive Black 3, C.I. Reactive Black 4, and C.I. Reactive Black 35.

The content of the coloring material in the ink is not particularly limited, and can be suitably set according to the purpose. However, from the viewpoint of increasing the image density and achieving good fixability and discharge stability, with respect to the total amount of the ink, it is preferable that the content of the coloring material is 0.1% by mass or more and 15% by mass or less, and it is more preferable that the content of the coloring material is 1% by mass or more and 10% by mass or less.

The method of dispersing the pigment (A) in the ink is not particularly limited and may be suitably selected according to the purpose, for example, a method of introducing a hydrophilic functional group into the pigment to form a self-dispersible pigment, a method of coating the surface of the pigment with a resin and dispersing the pigment, a method of dispersing the pigment with a dispersing agent, and the like, may be performed.

A method of making a self-dispersible pigment by introducing a hydrophilic functional group into the pigment includes, for example, a method of making a pigment (for example, carbon) dispersible in water by adding a functional group such as a sulfone group or a carboxyl group to the pigment.

A method of coating the surface of the pigment with a resin and dispersing the pigment includes including the pigment in microcapsules and making the pigment dispersible in water. The pigment obtained by this method can be referred to as a resin-coated pigment. In this case, all pigments blended in the ink need not be coated with a resin, but pigment that is not coated or partially coated pigment may be dispersed in the ink.

Examples of the above-described method of dispersing the pigment by using a dispersing agent include a method of dispersing the pigment by using a publicly known low molecule type dispersing agent or a publicly known high molecule type dispersing agent, represented by a surfactant.

As the dispersing agent, there is no particular limitation, and the dispersing agent can be suitably selected according to the pigment used, for example, an anionic surfactant, a cationic surfactant, an amphoteric surfactant, a nonionic surfactant, or the like can be used.

As the dispersing agent, RT-100 (nonionic surfactant, manufactured by Takemoto Oil & Fat Co., Ltd.) or a Na formalin condensate of naphthalene sulfonate may be suitably used.

With regard to the aforementioned dispersing agents, one of these kinds may be used alone or two or more kinds may be used in combination.

The ink can be obtained by mixing materials such as the water, the organic solvent, or the like with the pigment (A). The ink can be obtained by mixing materials such as water, the organic solvent, or the like with a pigment dispersion formed by mixing the water, the dispersing agent, or the like with the pigment (A).

The pigment dispersion can be obtained by mixing the water, the pigment (A), the dispersing agent, and other components according to need, and dispersing these materials and adjusting the particle size. The dispersing may be performed by using a dispersing machine.

The particle size of the pigment (A) in the pigment dispersion is not particularly limited, and can be suitably set according to the purpose. However, from the viewpoint of better dispersion stability of the pigment, discharge stability, and higher image quality such as image density, the particle size of the maximum frequency in terms of the maximum particle number conversion is preferably 20 nm or more and 500 nm or less, more preferably 20 nm or more and 150 nm or less.

As a method of measuring the particle size of the pigment (A) in the pigment dispersion, there is no particular limitation, and the particle size can be suitably selected according to the purpose. For example, the particle size can be measured by using a particle size analyzing device (Nanotrac Wave-UT151, manufactured by Microtrack Bell Co., Ltd.).

The content of the pigment in the pigment dispersion is not particularly limited, and can be suitably set according to the purpose. However, from the viewpoint of obtaining good discharge stability and increasing the image density, with respect to the total amount of the pigment dispersion, the content of the pigment is preferably 0.1% by mass or more and 50% by weight or less, and more preferably 0.1% by mass or more and 30% by mass or less.

The pigment dispersion preferably undergoes coarse particle filtration with a filter, a centrifuge device, or the like, and degassing, according to need.

—Resin—

The resin is not particularly limited and can be suitably selected according to the purpose. Examples of the resin include a urethane resin, a polyester resin, an acrylic resin, a vinyl acetate resin, a styrene resin, a butadiene resin, a styrene-butadiene resin, a vinyl chloride resin, an acrylic styrene resin, an acrylic silicone resin, and the like. Resin particles of these resins may be used.

The ink can be obtained by mixing a resin emulsion obtained by dispersing the resin particles, with materials such as the coloring material and the organic solvent, by using water as a dispersion medium. As the resin particles, resin particles that are suitably synthesized, or commercially available resin particles may be used. One of these kinds of resin particles may be used alone or two or more kinds of resin particles may be used in combination.

Among these, the urethane resin particles are capable of forming an image having a strong tack force and increasing image fixability, and are thus preferable. It is preferable to mix the urethane resin particles with other resin particles from the viewpoint of anti-blocking properties.

Further, it is preferable that the glass transition temperature (Tg) of the urethane resin particles is −20° C. or more and 70° C. or less from the viewpoint of forming an image having a larger tack force and increased fixability.

Among the resins described above, acrylic resin particles using acrylic resin are widely used because they have excellent discharge stability and are low cost. From the viewpoint of increasing rub resistance, it is preferable to mix the elastic polyurethane resin particles with the acrylic resin particles.

The volume average particle diameter of the resin particles is not particularly limited, and can be suitably set according to the purpose. However, from the viewpoint of obtaining good fixability and high image hardness, the particle diameter is preferably 10 nm or more and 1,000 nm or less, and more preferably 10 nm or more and 200 nm or less, and further preferably 10 nm or more and 100 nm or less.

As the method of measuring the volume average particle size, there is no particular limitation, and the method can be suitably selected according to the purpose. For example, the volume average particle size can be measured by using a particle size analyzing device (Nanotrac Wave-UT151, manufactured by Microtrack Bell Co., Ltd.).

The content of the resin in the ink is not particularly limited, and can be suitably set according to the purpose. However, from the viewpoint of fixability and storage stability of the ink, with respect to the total amount of ink, the content of the resin is preferably 1% by mass or more and 30% by mass or less, and more preferably 5% by mass or more and 20% by mass or less.

The particle size of solids in the aforementioned ink is not particularly limited, may be suitably set according to the purpose. However, from the viewpoint of improving discharge stability and the image quality such as image density, with respect to solids in the ink, the particle size of the maximum frequency in terms of the maximum particle number conversion is preferably 20 nm or more and 1000 nm or less, and more preferably 20 nm or more and 150 nm or less. The solids in the ink includes resin particles and pigment particles.

As a method of measuring the particle size of solids in the ink, there is no particular limitation, and the particle size can be suitably selected according to the purpose. For example, the particle size can be measured by using a particle size analyzing device (Nanotrac Wave-UT151, manufactured by Microtrack Bell Co., Ltd.).

—Wax—

The rub resistance of ink can be increased by including wax in the ink.

Further, when the resin and the wax are used together, the glossiness can be increased.

As the wax described above, polyethylene wax is preferable.

As the polyethylene wax, polyethylene wax that is suitably synthesized or commercially available polyethylene wax may be used.

Examples of the commercially available polyethylene wax include AQUACER 531 (manufactured by BYK Chemie Japan Co., Ltd.), Polylon P502 (manufactured by Chukyo Oil Co., Ltd.), Aquapeto DP2502C (manufactured by Toyo Adre Co., Ltd.), and Aquapetro DP2401 (manufactured by Toyo Adre Co., Ltd.). One of these kinds may be used alone or two or more kinds may be used in combination.

As the content of the polyethylene wax, there is no particular limit, and the content can be suitably set according to the purpose. However, with respect to the total amount of ink, the content of the polyethylene wax is preferably 0.05% by mass or more and 2% by mass or less by mass, and more preferably 0.05% by mass or more and 0.5% by mass or less.

When the content of the polyethylene wax is 0.05% by mass or more and 2% by mass or less, it is sufficiently effective to increase the rub resistance and glossiness.

Furthermore, when the content of the polyethylene wax is 2% by mass or less, the storage stability and discharge stability of the ink is particularly good, and is more appropriate for use in the inkjet method.

—Additive—

The additive is not particularly limited and may be suitably selected according to the purpose. Examples of the additive include surfactants, antifoaming agents, antiseptic mildew-proofing agents, antirust agents, pH adjusting agents, and the like.

—Surfactant—

As the surfactant as the above-described additive, there is no particular limitation, and the surfactant can be suitably selected according to the purpose, for example, silicone-based surfactant, fluorine-based surfactant, amphoteric surfactant, nonionic-based surfactant, anionic-based surfactant, and the like may be used.

—Silicone-Based Surfactant—

As the silicone-based surfactant, there is no particular limitation, and the silicone-based surfactant may be suitably selected according to the purpose, but it is preferable that the silicone-based surfactant does not decompose even at a high pH. Examples include side-chain modified polydimethylsiloxanes, both-end-modified polydimethylsiloxanes, one-end-modified polydimethylsiloxanes, side-chain both-end-modified polydimethylsiloxanes, and the like. Of these, those having a polyoxyethylene group and a polyoxyethylene polyoxypropylene group as a modifying group are preferable from the viewpoint of exhibiting good properties as a water-based surfactant.

A polyether-modified silicone-based surfactant may also be used as the silicone-based surfactant.

The polyether-modified silicone-based surfactant is not particularly limited and can be suitably selected according to the purpose. For example, there is the polyalkylene oxide structure is introduced into the Si side chain of the dimethyl polysiloxane represented by the general formula (S-1).

[Chem.1]

General formula (S-1)

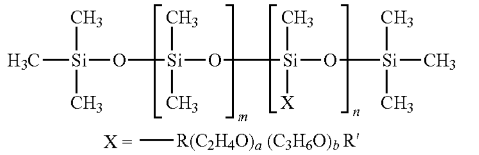

$X = -R(C_2H_4O)_a(C_3H_6O)_bR'$ (In general formula (S-1), m, n, a, and b represent integers independently, R represents an alkylene group, and R' represents an alkyl group.)

As the silicone-based surfactant, a silicone-based surfactant that is suitably synthesized or a commercially available silicone-based surfactant may be used.

The commercially available silicone-based surfactant may be obtained, for example, from BYK Chemie Japan Co., Ltd., Shin-Etsu Chemical Co., Ltd., Toray Dow Corning Silicone Co., Ltd., Nihon Emulsion Co., Ltd., Kyoeisha Chemical Co., Ltd., and the like.

Examples of commercially available polyether-modified silicone-based surfactants include KF-618, KF-642, KF-643 (manufactured by Shin-Etsu Chemical Co., Ltd.), EMALEX-SS-5602, SS-1906EX (manufactured by Nihon Emulsion Co., Ltd.), FZ-2105, FZ-2118, FZ-2154, FZ-2161, FZ-2162, FZ-2163, FZ-2164 (manufactured by Toray Dow Corning Silicone Co., Ltd.), BYK-33, BYK-387 (manufactured by BYK Chemie Japan Co., Ltd.), TSF4440, TSF4452, TSF4453 (manufactured by Toshiba Silicone Co., Ltd.), and the like.

—Fluorine-Based Surfactant—

The fluorine-based surfactant is not particularly limited and may be suitably selected according to the purpose, but compounds having 2 to 16 fluorine-substituted carbons are preferable, and compounds having 4 to 16 fluorine-substituted carbons are more preferable.

Examples of the fluorine-based surfactants include perfluoroalkylsulfonic acid compounds, perfluoroalkylcarboxylic acid compounds, perfluoroalkylphosphate compounds, perfluoroalkylethylene oxide adducts, and polyoxyalkylene ether polymer compounds having a perfluoroalkyl ether group on the side chain. Among these, from the viewpoint of low foaming property, a polyoxyalkylene ether polymer compound having a perfluoroalkyl ether group as a side chain is preferable, and the fluorine-based surfactants represented by the following general formula (F-1) and general formula (F-2) are more preferable.

[Chem.2]

General formula (F-1)

$$CF_3CF_2(CF_2CF_2)_m—CH_2CH_2O(CH_2CH_2O)_nH$$

In the compound of the above general formula (F-1), m is preferably an integer of 0 to 10 and n is preferably an integer of 0 to 40 to apply water solubility.

General formula (F-2)

$$C_nF_{2n+1}—CH_2CH(OH)CH_2—O—(CH_2CH_2O)_a—Y$$

In a compound of the above general formula (F-2), Y is H, or m is an integer of 1 to 6 in $CmF_{2m+1}$, or m is an integer of 4 to 6 in $CH_2CH(OH)CH_2—CmF_{2m+1}$, or p is an integer of 1 to 19 in $CpH_{2p+1}$. The notation of n is an integer of 1 to 6. The notation of a is an integer of 4 to 14.

Examples of the perfluoroalkylsulfonate compounds include perfluoroalkylsulfonic acids, perfluoroalkylsulfonates, and the like.

Examples of the perfluoroalkylcarboxylic acid compounds include perfluoroalkyl-carboxylic acids, perfluoroalkylcarboxylates and the like.

Examples of the aforementioned polyoxyalkylene ether polymer compounds having a perfluoroalkyl ether group as a side chain include sulfate salts of a polyoxyalkylene ether polymer having a perfluoroalkyl ether group as a side chain, salts of a polyoxyalkylene ether polymer having a perfluoroalkyl ether group as a side chain, and the like.

Examples of counterions of the salts in the fluorine-based surfactants include Li, Na, K, $NH_4$, $NH_3CH_2CH_2OH$, $NH_2(CH_2CH_2OH)_2$, $NH(CH_2CH_2OH)_3$, and the like.

As the fluorine-based surfactant, a fluorine-based surfactant that is suitably synthesized or a commercially available fluorine-based surfactant may be used.

Examples of commercially available fluorine-based surfactants include Surflon S-111, S-112, S-113, S-121, S-131, S-132, S-141, and S-145 (manufactured by AGC Inc.); Fluorad FC-93, FC-95, FC-98, FC-129, FC-135, FC-170C, FC-430, and FC-431 (manufactured by Sumitomo 3M Limited); Megaface F-470, F-1405, and F-474 (manufactured by DIC Corporation); Zonyl TBS, FSP, FSA, FSN-100, FSN, FSO-100, FSO, FS-300, UR, Capstone FS-30, FS-31, FS-3100, FS-34, FS-35 (manufactured by Chemours Corporation); FT-110, FT-250, FT-251, FT-400S, FT-150, FT-400SW (manufactured by Neos Company Limited), Polypox PF-136A, PF-156A, PF-151N, PF-154, PF-159 (manufactured by OMNOVA Solutions Inc.), and Unidyne DSN-403N (manufactured by Daikin Industries, Ltd.). Among these, FS-3100, FS-34, and FS-300 manufactured by Chemours Corporation, FT-110, FT-250, FT-251, FT-400S, FT-150, FT-400SW manufactured by Neos Company Limited, Polypox PF-15IN manufactured by OMNOVA Solutions Inc., and Unidyne DSN-403N manufactured by Daikin Industries, Ltd., are preferable in terms of good printing quality, particularly significantly improving color development, permeability to paper, wettability, and uniformity.

—Amphoteric Surfactant—

The amphoteric surfactants are not particularly limited and may be selected depending on the purpose, for example, lauryl aminopropionate, lauryl dimethyl betaine, stearyl dimethyl betaine, lauryl dihydroxyethyl betaine, and the like.

—Nonionic Surfactant—

The nonionic surfactants are not particularly limited and may be suitably selected according to the purpose, for example, polyoxyethylene alkylphenyl ether, polyoxyethylene alkyl ester, polyoxyethylene alkylamine, polyoxyethylene alkylamide, polyoxyethylene propylene block polymer, sorbitan fatty acid ester, polyoxyethylene sorbitan fatty acid ester, ethylene oxide adduct of acetylene alcohol, and the like may be used.

—Anionic Surfactant—

The anionic surfactant is not particularly limited and may be suitably selected according to the purpose, for example, salts of polyoxyethylene alkyl ether acetate, dodecyl benzene sulfonate, laurylate, polyoxyethylene alkyl ether sulfate, and the like may be used.

One of these kinds may be used alone or two or more kinds may be used in combination.

The content of the surfactant in the ink is not particularly limited, and can be suitably set according to the purpose. However, in terms of excellent wettability, discharge stability, and improved image quality, with respect to the total amount of ink, the content of the surfactant is preferably 0.001% by mass or more and 5% by mass or less, and more preferably 0.05% by mass or more and 5% by mass or less.

—Antifoaming Agent—

Surfactants used as other components may also be used as antifoaming agents.

The antifoaming agent is not particularly limited and may be suitably selected according to the purpose, for example, a silicone-based antifoaming agent, a polyetherbased antifoaming agent, a fatty acid ester-based antifoaming agent, and the like may be used. One of these kinds may be used alone or two or more kinds may be used in combination. Among these, a silicone-based antifoaming agent is preferable from the point of an excellent foam braking effect.

—Antiseptic Mildew-Proofing Agent—

The antiseptic mildew-proofing agents are not particularly limited and can be suitably selected according to the purpose, for example, 1,2-benzisothiazoline-3-one and the like may be used.

—Antirust Agent—

The antirust agent is not particularly limited and can be suitably selected according to the purpose, for example, acid sulfite, sodium thiosulfate, and the like may be used.

—pH Adjusting Agent—

As the pH adjusting agent, there is no particular limitation, as long as the pH can be adjusted to 7 or more. For example, amines such as diethanolamine, triethanolamine, and the like may be used.

<Contacted Member>

The contacted member according to an embodiment of the present invention is not particularly limited, and can be suitably selected according to the purpose. For example, a recording medium such as plain paper, glossy paper, specialty paper, cloth, or the like can be used. Among these, a low-permeability recording medium (hereinafter also referred to as a low-absorbency recording medium) can be suitably used.

<<Low-Permeability Recording Medium>>

A low-permeability recording medium means a recording medium having a surface that has low water permeability, low absorbability, or low adsorptive properties, and may have multiple cavities therein, including cavities that are not open to the outside.

The low-permeability recording medium is not particularly limited and can be suitably selected according to the purpose, for example, a low-permeability recording medium having a backing and a surface layer (B) disposed on at least one side of the backing, and having other layers according to need, may be used.

The "surface layer (A)" of the contact member is different from the "surface layer (B)" in the contacted member. As a matter of convenience, in the present specification, the surface layer of the contact member is described as the "surface layer (A)" and the surface layer of the contacted member is described as the "surface layer (B)". Details of the "surface layer (B)" are described later.

Examples of the aforementioned low-permeability recording medium include a recording medium such as coated paper used for commercial printing or paperboard in which recycled paper pulp is incorporated into the middle and back layers and the surface is coated.

The low-permeability recording medium has a strong grip force compared to a recording medium such as plain paper, and the friction generated between the low-permeability recording medium and the contact member is increased. Therefore, there is a problem that it is difficult to maintain the shape of the surface layer (A). By using the contact member according to an embodiment of the present invention by which the shape of the surface layer (A) is maintained, it is possible to prevent the transfer of a component derived from the liquid composition from the contacted member to the contact member for a long period of time, even when a low-permeability recording medium is used.

In the low-permeability recording medium, it is preferable that the transfer amount of pure water and ink to the low-permeability recording medium during a contact time of 100 ms measured by the dynamic scanning absorptometer, is preferably 2 $mL/m^2$ or more and 35 $mL/m^2$ or less, and more preferably 2 $mL/m^2$ or more and 10 $mL/m^2$ or less.

If the transfer amount of pure water and ink to the aforementioned low-permeability recording medium during a contact time of 100 ms measured by a dynamic scanning absorptometer is 2 $mL/m^2$ or more, it is possible to eliminate the problem that beading is likely to occur.

If the amount of transfer of pure water and ink to the low-permeability recording medium during a contact time of 100 ms measured by a dynamic scanning absorptometer is 35 $mL/m^2$ or less, the problem that the ink dot diameter after image formation is too small can be eliminated.

In the low-permeability recording medium, the transfer amount of pure water and ink to the low-permeability recording medium during a contact time of 400 ms measured by the dynamic scanning absorptometer, is preferably 3 $mL/m^2$ or more and 40 $mL/m^2$ or less, and more preferably 3 $mL/m^2$ or more and 10 $mL/m^2$ or less.

If the amount of transfer of pure water and ink to the low-permeability recording medium during a contact time of 400 ms measured by a dynamic scanning absorptometer is 3 $mL/m^2$ or more, it is possible to solve the problem of insufficient drying.

If the amount of transfer of pure water and ink to the low-permeability recording medium during a contact time of 400 ms measured by a dynamic scanning absorptometer is 40 $mL/m^2$ or less, it is possible to solve the problem that the glossiness of the image part after drying is reduced.

The transfer amount of pure water and ink to the low-permeability recording medium during a contact time of 100 ms and during a contact time of 400 ms can both be measured on the side having the surface layer (B) of the low-permeability recording medium.

Here, a dynamic scanning absorptometer (Kuga, Shigenori. "DSA", Japan Technical Association of the Pulp and Paper Industry Journal, Vol. 48, May 1994, pp. 88-92) is a device that can accurately measure the amount of liquid absorbed in an extremely short period of time. The dynamic scanning absorptometer automates the measurement performed by a method of reading the velocity of the absorption from the movement of the meniscus in the capillary, making the sample disk-like, and then helically scanning the absorption head on the sample, and automatically changing the scan velocity according to a predetermined pattern, and measuring the required number of points on one sheet of the sample.

The liquid dispensing head to the paper sample is connected to the capillary via a Teflon (registered trademark) tube, and the position of the meniscus in the capillary is automatically read by an optical sensor. Specifically, the amount of transfer of pure water or ink can be measured using a dynamic scanning absorptometer (K350 Series D, manufactured by Kyowa Co., Ltd.).

The amount of transfer of pure water and ink to the aforementioned low-permeability recording medium during the contact times of 100 ms and 400 ms can be obtained by interpolation from the measurement value of the transfer amount during a contact time near the respective contact times.

—Backing—

The backing is not particularly limited and may be suitably selected according to the purpose, and may include, for example, wood fiber-based paper and a sheet-like material such as non-woven fabric primarily including wood fiber and synthetic fiber.

The "support layer" in the contact member and the "backing" in the contacted member are different from each other.

The average thickness of the backing is not particularly limited and may be suitably selected according to the purpose, although 50 μm to 300 μm is preferable. Also, the basis weight of the backing is preferably 45 $g/m^2$ to 290 $g/m^2$.

—Surface Layer (B)—

The surface layer (B) is not particularly limited and may be suitably selected according to the purpose, for example, the surface layer (B) may include a pigment (B), a binder, and a surfactant or other components according to need.

Note that the "pigment (A)" in the liquid composition is different from the "pigment (B)" in the contacted member. In the present specification, as a matter of convenience, the pigment in the liquid composition is referred to as "pigment (A)" and the pigment in the contacted member is referred to as "pigment (B)".

Note that the "resin" or "resin particles" in the liquid composition are different from the "binder" in the contacted member. In the present specification, as a matter of convenience, the term "resin" or "resin particles" will be used with respect to the liquid composition and the term "binder" will be used with respect to the contacted member.

—Pigment (B)—

As the pigment (B), an inorganic pigment or a combination of an inorganic pigment and an organic pigment can be used.

The inorganic pigment in the pigment (B) is not particularly limited and may be suitably selected according to the purpose, for example, kaolin, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, chlorite, and the like may be used.

The amount of the inorganic pigment added in the pigment (B) is preferably 50 parts by mass or more with respect to 100 parts by mass of the binder, which will be described later.

The organic pigment in the pigment (B) is not particularly limited and may be suitably selected according to the purpose, for example, water soluble dispersions such as styrene-acrylic copolymer particles, styrene-butadiene copolymer particles, polystyrene particles, polyethylene particles, and the like may be used.

The amount of the organic pigment added in the pigment (B) is preferably 2 parts by mass or more and 20 parts by mass or less with respect to 100 parts by mass of the pigment (B) in the surface layer (B).

—Binder—

As the binder, at least one of a water-soluble resin and a water-dispersible resin can be suitably used.

The water-soluble resin as the binder is not particularly limited and may be suitably selected according to the purpose, for example, polyvinyl alcohol, cationically modified polyvinyl alcohol, acetal-modified polyvinyl alcohol, polyester, polyurethane, polyester, polyurethane, and the like may be used.

—Surfactant—

The surfactant included in the surface layer (B) according to need, is not particularly limited, and may be suitably selected according to the purpose, for example, anionic surfactant, cationic surfactant, amphoteric surfactant, nonionic surfactant, and the like may be used.

The method of forming the surface layer (B) is not particularly limited, and can be suitably selected according to the purpose, and the liquid constituting the surface layer (B) on the backing can be applied by an impregnation method or an application method.

The adhesion amount of the liquid constituting the surface layer (B) is not particularly limited, and can be suitably selected according to the purpose, and is preferably 0.5 $g/m^2$ to 20 $g/m^2$, and more preferably 1 $g/m^2$ to 15 $g/m^2$ in solids.

(Drying Apparatus)

The drying apparatus according to an embodiment of the present invention is an apparatus for drying a contacted member to which a liquid composition is applied by heating, and the apparatus has the contact member as described above, and may optionally have other members.

(Printing Apparatus)

The printing apparatus according to an embodiment of the present invention may include a liquid composition applying means, and may include contacted member supplying means, contacted member retrieving means, a conveying path, and other means, according to need.

<Liquid Composition Applying Means>

The liquid composition applying means according to an embodiment of the present invention refers to a means for applying a liquid composition to a contacted member.

The liquid composition applying means is not particularly limited and may be suitably selected according to the purpose, for example, an inkjet discharging head having a plurality of nozzle rows having a plurality of nozzles arranged therein, various publicly known means such as spin coats, spray coats, gravure roll coats, reverse roll coats, bar coats, and the like may be suitably used.

<Contacted Member Supplying Means>

The contacted member supplying means according to an embodiment of the present invention refers to a means for supplying the contacted member.

The contacted member supplying step according to an embodiment of the present invention refers to the step of supplying the contacted member.

The contacted member supplying step may be performed by the contacted member supplying means.

<Contacted Member Retrieving Means and Contacted Member Retrieving Step>

The contacted member retrieving means according to an embodiment of the present invention refers to a means for retrieving the contacted member.

The contacted member retrieving step according to an embodiment of the present invention refers to the step of retrieving the contacted member.

The contacted member retrieving step can be performed by the contacted member retrieving means.

<Conveying Path>

The conveying path according to an embodiment of the present invention refers to a path in which the contacted member supplied from the contacted member supplying means is conveyed until the contacted member is retrieved by the contacted member retrieving means.

It is preferable that the length of the contacted member in the conveying direction is longer than the length of the conveying path.

Here, one embodiment of the printing apparatus according to an embodiment of the present invention will be described with reference to FIGS. 1 to 2. However, the use of the printing apparatus according to an embodiment of the present invention is not limited in any way to these embodiments.

In each drawing, the same components are denoted by the same reference numerals and overlapping descriptions may be omitted. Further, the number, position, shape, and the like of the following components are not limited to the present embodiment, and the number, position, shape, and the like preferable for implementing the present invention may be used.

FIG. 1 is a schematic diagram illustrating an example of a printing apparatus using continuous paper; and FIG. 2 is a schematic diagram illustrating the contacted member in contact with the contact member.

The printing apparatus 100 illustrated in FIG. 1 includes a contacted member supplying unit 1 (contacted member supplying means), a liquid composition applying unit 2 (liquid composition applying means), a heating member 3, a contact member 4, and a contacted member retrieving unit 6 (contact member retrieving means).

The printing apparatus 100 includes a drying apparatus 50, and the drying apparatus 50 may be an integral device with the printing apparatus 100 or a separate device from the printing apparatus 100.

—Contacted Member Supplying Unit—

The contacted member supplying unit 1 is rotatably driven to supply a contacted member 7, which is wound into a roll and housed therein, to the conveying path 8 in the printing apparatus 100. A conveying direction of the contacted member 7 in the conveying path 8 is indicated by an arrow D.

The contacted member supplying unit 1 adjusts the rotational driving thereof to convey the contacted member 7 at a high speed of 50 m/min or more.

The contacted member 7 is a sheet-like conveyed object that continuously extends in a conveying direction D of the printing apparatus 100, and is specifically a recording medium such as continuous paper. The contacted member 7 is conveyed along the conveying path 8 between the contacted member supplying unit 1 and the contacted member retrieving unit 6. The length of the contacted member 7 in the conveying direction D is longer than the length of the conveying path 8 of the contacted member 7 provided at least between the contacted member supplying unit 1 and the contacted member retrieving unit 6. As described above, the printing apparatus 100 according to the present embodiment uses the contacted member 7 that continuously extends in the conveying direction D of the printing apparatus 100 and conveys the contacted member 7 at a high speed. For this purpose, a large tension is applied to the contacted member 7 between the contacted member supplying unit 1 and the contacted member retrieving unit 6.

—Liquid Composition Applying Unit—

The liquid composition applying unit 2 is an inkjet discharging head including a plurality of nozzle rows having a plurality of nozzles arranged therein, and the nozzles are disposed such that the discharge direction of ink from the nozzles faces the conveying path 8 of the contacted member 7. Accordingly, the liquid composition applying unit 2 sequentially discharges ink of the colors of magenta (M), cyan (C), yellow (Y), and black (K), as the liquid composition, to the contacted member 7. The color of the ink to be discharged is not be limited thereto, but may be white, gray, silver, gold, green, blue, orange, violet, or the like.

Note that although the liquid composition has been described as ink in the present embodiment as an example, other liquid compositions may be used as described above.

Also, although the liquid composition is applied to the contacted member 7 by an inkjet discharging head as an example in the present embodiment, the liquid composition may be applied by other means as described above.

Heating Member

The heating member 3 heats and dries the liquid composition applied to the contacted member 7 from the back side of the surface of the contacted member 7 having a region where the liquid composition is applied. Note that the means for heating the liquid composition is not particularly limited, but various publicly known means can be used, such as means for blowing hot air or means or a means for contacting the back surface of the contacted member 7 with a flat heater to dry the liquid composition.

The heating member 3 is disposed near the contact member 4, which will be described later. Therefore, when the printing apparatus 100 is used, the temperature of the surface of the contact member 4 may be high (for example, 70° C. or more and 260° C. or less). As described above, when the contact member to which the fluorine resin particles are adhered is used in the environment in which the surface temperature of the contact member becomes high, generally, the fluorine resin particles soften and tend to detached from the contact member surface. However, when the configuration according to the present embodiment is used, the detachment of the fluorine resin particles is prevented as described above, and, therefore, it is possible to achieve the effect of significantly preventing the transfer of a component derived from the liquid composition from the contacted member to the contact member.

In this application, the term "heating means" and the term "heating member" are clearly distinguished.

As described above, the heating means is a means for applying heat to the contacted member through the surface layer (A) and is provided as a means for constituting the contact member.

On the other hand, the heating member is a member that is incorporated into the drying apparatus or the printing apparatus as a separate member from the contact member.

—Contact Member—

The contact member 4 is a roller having a shape of a column or a cylinder, that conveys the contacted member 7 while changing the conveying direction D of the contacted member 7.

In the printing apparatus 100 according to the present embodiment, as described above, the contacted member supplying unit 1 conveys the contacted member 7 at 50 m/min or more. When the contacted member 7 is conveyed at such a high speed, as illustrated in FIG. 1, when the conveying direction of the contacted member 7 is changed by the contact member 4, a large pressure is applied between the contact member 4 and the contacted member 7. This results in an increase in friction due to the application of pressure to the contact member 4. However, according to the configuration of the present embodiment, the shape of the surface layer (A) is maintained as described above (that is, the root mean square height Sq in the surface layer (A) is maintained at 1.0 μm or more, and the orthogonal line roughness ratio in the surface layer (A) is maintained at 0.7 or more), and it is possible to prevent the transfer of a component derived from the liquid composition from the contacted member to the contact member for a long period of time.

As described above, the printing apparatus 100 according to the present embodiment conveys the contacted member 7 that continuously extends in the conveying direction D of the printing apparatus 100. Therefore, a large tension is applied to the contacted member 7 between the contacted member supplying unit 1 and the contacted member retrieving unit 6. In this case, as illustrated in FIG. 2, when the conveying direction of the contacted member 7 to which a large tension is applied is changed by the contact member 4, a large pressure is applied between the contact member 4 and the contacted member 7. Therefore, the friction associated with the application of pressure to the contact member 4 increases. However, according to the configuration of the present embodiment, the shape of the surface layer (A) is maintained as described above (that is, the root mean square height Sq in the surface layer (A) is maintained at 1.0 μm or more, and the orthogonal line roughness ratio in the surface layer (A) is maintained at 0.7 or more), and it is possible to prevent the transfer of a component derived from the liquid composition from the contacted member to the contact member for a long period of time.

Further, when the contact member 4 is a roller-shaped conveying roller, as illustrated in FIG. 1, the contacted member 7 is wound around the conveying roller, and thus the conveying direction of the contacted member 7 is changed. At this time, the winding rate of the contacted member 7 with respect to the conveying roller is preferably 10% or more, more preferably 15% or more, and even more preferably 20% or more.

When the winding rate of the contacted member 7 with respect to the conveying roller is 10% or more, the pressure per unit area between the conveying roller and the contacted member 7 is reduced, and the friction caused in the conveying roller is reduced.

Further, the winding rate of the contacted member 7 with respect to the conveying roller is preferably 90% or less, more preferably 70% or less, and further preferably 50% or less.

When the winding rate of the contacted member 7 with respect to the conveying roller is 90% or less, the contacted member 7 can be suitably conveyed.

The "winding rate" according to the present embodiment will be described with reference to FIG. 2. As illustrated in FIG. 2, when the contacted member 7 is wound around and brought into contact with the contact member 4 having a roller shape, the "winding rate" indicates the ratio of the circumferential length X of the contact member 4 between end portions 9*a* and 9*b* on the side where the contacted member 7 and the contact member 4 are in contact with each other, with respect to the total circumferential length X of the contact member 4, wherein when the contacted member is separated from the contact member at one end portion 9*a* and the other end portion 9*b*.

Further, the contact member 4 illustrated in FIG. 2 does not include a heating means for applying heat to the contacted member 7 through the surface layer (A), but may include a heating means. When the contact member 4 has a heating means, the temperature of the surface of the contact member may be high (e.g., 70° C. or more and 260° C. or less) when the printing apparatus 100 is used. As described above, when the contact member to which the fluorine resin particles are adhered is used in the environment in which the surface temperature of the contact member is high, generally, the fluorine resin particles soften and are easily detached from the contact member surface. However, when the configuration according to the present embodiment is used, the detachment of the fluorine resin particles is prevented as described above, and, therefore, it is possible to achieve the effect of significantly preventing the transfer of the component derived from the liquid composition from the contacted member to the contact member.

—Contacted Member Retrieving Unit—

The contacted member retrieving unit 6 is rotatably driven wind into a roll and store the contacted member 7 on which an image has been formed by applying a liquid composition.

(Printing Method)

The printing method according to an embodiment of the present invention includes a liquid composition applying step and a contact step, and may include a drying step and other steps according to need.

<Liquid Composition Applying Step>

The liquid composition applying step according to an embodiment of the present invention refers to the step of applying the liquid composition to the contacted member. The liquid composition applying step may be performed by the liquid composition applying means.

<Contact Process>

The contact step according to an embodiment of the present invention refers to the step in which the contact member and the contacted member to which the liquid composition is applied, are brought into contact with each other.

The contact step may be a conveying step in which the contact member conveys the contacted member by having the contact member contact a surface to which a liquid composition is applied of the contacted member.

<Drying Process>

The drying step according to an embodiment of the present invention refers to the step of drying the applied liquid composition by heating the applied liquid composition with a heating member, after the liquid composition applying step. When the heating means is incorporated in the contact member, the drying means may be executed by the contact member.

A printing method according to an embodiment of the present invention will now be described with reference to FIGS. 1 to 2. However, the use of the printing process of the present invention is not to be limited in any way to these embodiments.

In each drawing, the same components are denoted by the same reference numerals and overlapping descriptions may be omitted. Further, the number, position, shape, and the like of the following components are not limited to the present embodiment, and the number, position, shape, and the like preferable for implementing the present invention can be used.

—Liquid Composition Applying Step—

The liquid composition applying step is the step of applying a liquid composition, such as ink, to the contacted member 7 supplied from the contacted member supplying unit 1. This results in the formation of a region on the contacted member 7 to which the liquid composition is applied.

—Drying Step—

The drying step is a step of drying the applied liquid composition by heating the applied liquid composition by using the heating member 3 after the liquid composition applying step. It is preferable that the drying be performed such that the contacted member 7 does not feel sticky. As described above, when the heating means is incorporated in the contact member 4, the drying step may be performed by the contact member.

—Conveying Step—

In the present embodiment, a conveying step will be described as an example of a contact step. In the conveying step, after the drying step, the contacted member 7 is conveyed by contacting the contacted member 7 with the contact member 4. The conveying step may be performed either before or after the liquid composition applying step. The conveying step may also be performed either before or after the drying step. It is also preferable that the contact member 4 contacts the surface to which the liquid composition is applied of the contacted member 7.

EXAMPLES

Hereinafter, examples of the present invention will be described, but the present invention is not limited in any way to these examples.

<Example of Preparation of Self-Dispersible Black Pigment Dispersion>

In this example, 20 g of carbon black (NIPEX160, manufactured by Degussa AG, BET specific surface area 150 $m^2/g$, average primary particle size 20 nm, pH 4.0, DBP oil absorption amount 620 g/100 g), 20 mmol of a compound represented by the structural formula (1) below, and 200 mL of ion exchange high pure water were mixed with a Silverson mixer (6,000 rpm) at room temperature.

If the resulting slurry had a pH greater than 4, 20 mmol of nitric acid was added. After stirring for 30 minutes, sodium nitrite (20 mmol) dissolved in a small amount of ion exchange high pure water was slowly added to the mixture. Further, the mixture was warmed to 60° C. while stirring, and reacted for 1 hour. Modified pigment was formed by adding a compound represented by the following structural formula (1) to carbon black.

A modified pigment dispersion was then obtained by adjusting the pH to 10 with an aqueous NaOH solution and stirring the mixture for 30 minutes. Ultrafiltration was performed by using a dialysis membrane, by using a dispersion including a pigment in which at least one geminal bisphosphonate group or geminal bisphosphonate sodium salt are bound with each other, and ion exchange high pure water, and then ultrasonic dispersion was performed to obtain a self-dispersible black pigment dispersion having a bisphosphonate group as a hydrophilic functional group having a pigment solid dispersion concentration of 16% by mass.

[Chem.3]

STRUCTURAL FORMULA (1)

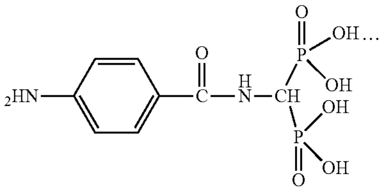

<Example of Preparation of Liquid Composition (Ink)>

In this example, 50.00% by mass of a self-dispersible black pigment dispersion (pigment solid concentration of 16%), 2.22% by mass of polyethylene wax AQUACER 531 (non-volatile content is 45% by mass, manufactured by BYK Chemie Japan Co., Ltd.), 30.00% by mass of 3-ethyl-3-hydroxymethyl oxetane, 10.0% by mass of propylene glycol monopropyl ether, 2.00% by mass of silicone-based surfactant (TEGO Wet 270, manufactured by TOMOE ENGINEERING CO., LTD.), and ionexchange water (residual) were mixed and stirred for 1 hour, and then filtration through a membrane filter with an average pore size of 1.2 μm was performed to obtain a liquid composition (ink).

<Examples of Manufacturing Contact Member>

Example 1

The surface of an aluminum hollow roller base material (A5052, manufactured by Misumi Corporation) having an 80 mm diameter was subjected to a blasting process by spraying 0.3 MPa of a polygonal alumina blasting agent with a count of 60 and a central particle diameter of 256 μm. Next, the base material was anodized in an aqueous solution of sulfuric acid (alumite sulfate process). More specifically, an electrode was attached to the end of the hollow roller base material, the hollow roller base material was immersed in 15% by mass of an aqueous solution of sulfuric acid adjusted to 0° C., and an electrolysis process was performed for 1 hour with a metal rod as the anode at a current density of 1.0 $Å/dm^2$, and an alumite sulfate film (a layer including aluminum oxide and in which sulfur content is detected) was precipitated to form a support layer having an average thickness of 29.5 μm. The surface was thoroughly washed with pure water, immersed in a PTFE dispersion (Fluon, manufactured by AGC Inc.) prepared at a solid concentration of 10%, and then an air-drying step was performed once. While rotating the hollow roller after air drying at a speed of 10 rpm, a polishing step was performed once by pressing and wiping the hollow roller with fluororesin fiber (Tommy Filec, manufactured by TOMOEGAWA CO., LTD.). The hollow roller thus obtained is integrated with a halogen lamp to form the contact member according to example 1.

Examples 2 to 14

The contact members of examples 2 to 14 were obtained in the same manner as in example 1, except that various conditions in the blasting process and the presence or absence of the process of adhering the fluorine resin particles in example 1 were changed to the contents indicated in tables 1 to 3 below.

Comparative Example 1

The contact member of comparative example 1 was obtained in the same manner as in example 1, except that the blasting process in example 1 was not performed.

Comparative Examples 2 and 3

Contact members of comparative examples 2 and 3 were obtained in the same manner as in example 1, except that irregularities were formed in the conveying direction of the base material by a lathe instead of the blasting process in example 1. In comparative example 2, the surface is processed by a lathe so that the surface visually appears to be substantially smooth, and in comparative example 3, the surface is processed by a lathe so that the surface visually appears to have streak-like irregularities.

Comparative Example 4

The contact member of comparative example 4 was obtained in the same manner as in example 1, except that the anodizing process (the alumite sulfate process) in the aqueous sulfuric acid solution in example 1 was not performed.

Next, in the contact members of examples 1 to 14 and comparative examples 1 to 4, the ratio of the area where the surface layer (A) and the contacted member are in contact with respect to the area of the surface layer (A) (contact area ratio), the root mean square height Sq of the surface layer (A), the orthogonal line roughness ratio if the surface layer (A), the amount of elemental fluorine in the surface layer (A), the average thickness of the support layer, and the Vickers hardness of the contact member were respectively obtained according to the following methods, and the results are indicated in tables 1 to 3 below.

As a matter of reference, an image representing a height in the surface layer (A) of example 1 (see FIG. 3), an image representing a height in the surface layer (A) of comparative example 2 (see FIG. 4), an image representing a height profile in the cross-section of the surface layer (A) of example 1 (see FIG. 5), and an image representing a height profile in the cross-section of the surface layer (A) of comparative example 1 (see FIG. 6) are illustrated. However, the line in FIGS. 5 and 6 represents a plane parallel to the surface layer (A) having a depth of 5 μm from the maximum height (the surface portion of the surface layer (A)).

<Method of Measuring Contact Area Ratio>

First, the surface layer (A) was observed with a laser microscope (LEXT OLS4000 manufactured by Olympus Corporation) at a magnification of 20 times to obtain the height profile. Next, in the acquired height profile, a contact area, which is a cross-sectional area formed when cutting a plane parallel with the surface layer (A), at a depth of 5 μm from the maximum height (the top surface portion of the surface layer (A)), was obtained. Then, the ratio of the contact area to the observed area (contact area/observed area) was calculated to obtain the contact area ratio.

<Measurement Method of Root Mean Square Height Sq>

The surface layer (A) was observed with a laser microscope (LEXT OLS4000 manufactured by Olympus Corporation) at a magnification of 20 times, and calculation was performed according to JIS B 0601:2013.

<Measurement Method of Orthogonal Line Roughness Ratio>

First, any point of the surface layer (A) was defined as the measurement center point, and the line roughness of the surface layer (A) in any direction from the measurement center point was measured with a laser microscope (LEXT OLS4000, manufactured by Olympus Corporation) at a magnification of 20 times and a measurement length of 260 μm. Then, the line roughness in the measurement direction in which the line roughness is minimal and the line roughness in the direction perpendicular to the measurement direction in which the line roughness is minimal were obtained. Further, new measurement center points were defined at 100 μm intervals in a certain direction from the above measurement center point, and the line roughness in the measurement direction where line roughness is minimal and line roughness in the direction perpendicular to the measurement direction where line roughness is minimal were obtained in the same manner as the measurement at the above measurement center point. A total of five measurements at measurement center points were made, and Ra (Min.) was obtained, which is the average line roughness in the measurement direction in which the line roughness is minimal, and Ra (90°) was obtained, which is the average line roughness in the direction perpendicular to the measurement direction in which the line roughness is minimal. Then, the ratio of Ra (Min.) to Ra (90°) was calculated <Ra (Min.)/Ra (90°)> to obtain the orthogonal line roughness ratio.

<Method for Measuring Elemental Fluorine Amount>

Spectral analysis was performed on the surface layer (A) under the following conditions, and the amount of elemental fluorine was obtained by performing automatic quantitation by using analysis software. The amount of elemental fluorine was obtained at any five points in a similar manner to the above. Then, an average value of the obtained values was used as the amount of elemental fluorine.

Device: Scanning electronic microscope Merlin manufactured by Carl Zeiss AG

EDS detector: Electronic cooling SDD detector UltraDry manufactured by Thermo Fisher Scientific, Inc.

Acceleration voltage: 3.0 kV

W. D.: 13.0 mm

Take-off angle: 35.0 deg.

Magnification: 2,000 times

Conductive process: C-coat

Accumulated time: 10 sec.

Accumulated frequency: 100 times

Drift correction: Yes

Analysis software: NORAN System 6 manufactured by Thermo Fisher Scientific, Inc.

<Measurement Method of Average Thickness>

First, the mapping of the sulfur, aluminum, and oxygen components was performed on the cross-section of the contact member, by using an EDS elemental analysis (UltraDry, manufactured by Thermo Fisher Scientific, Inc.). Next, the region where all of the sulfur, aluminum, and oxygen components were detected was determined to be the support layer, and the length in the support layer of a perpendicular line drawn from the surface of the support layer in the direction of the base material, was obtained. Similarly, at any 10 points, the length of the perpendicular line in the support layer was obtained, and the average value of these values was defined as the average thickness of the support layer.

<Method of Measuring Vickers Hardness>

The Vickers hardness was measured according to the test method of JIS Z 2244.

Next, the following method was used to evaluate the extent to which the component derived from the liquid composition is transferred from the contacted member to the contact members of examples 1 to 14 and comparative examples 1 to 4 (hereinafter, also referred to as "transfer property"), by using the contact member in the initial state and the contact member after the durability test.

Further, the shape of the transfer portion (area and aspect ratio) and the heat transfer property of the contact member were evaluated according to the following method.

<Evaluation of Transfer Property (Initial State)>

A printing apparatus as a modification was fabricated by incorporating contact members of examples 1 to 14 and comparative examples 1 to 4 into an inkjet printing system (RICOH Pro VC60000, manufactured by Ricoh Co., Ltd.), and a solid image was formed by discharging a liquid composition (ink) from an inkjet head that is a liquid composition applying means to a recording medium (Magno Satin 300 gsm, manufactured by Sappi Co., Ltd., a low-permeability recording medium) that is a contacted member, such that the amount of applied ink was 0.9 $\mu L/cm^2$.

Next, a drying step was performed in which a drying roller having a surface temperature of 120° C. was brought into contact with a surface of the contacted member on which a liquid composition has not been applied, so as to dry the liquid composition while conveying the contacted member. At this time, drying energy (° C.xsec.) is defined as calculated by the following formula: "(temperature of contacted member during drying step—temperature of contacted member before drying step) (° C.)×contact time of contacted member and drying roller (sec.)".

Next, a contact member in which the surface layer (A) has been heated to a temperature of 120° C. by a built-in heating means (halogen lamp), was brought into contact with a surface of the contacted member to which a liquid composition has been applied, ten times under the condition that the contact time per contact is 0.2 seconds.

The above-described series of steps was performed by adjusting the conveying speed of the contacted member while changing the contact time (sec.) of the contacted member and the drying roller. The drying energy required for preventing the transfer of the component derived from the liquid composition from the contacted member to the contacted member was obtained, and evaluated according to the following evaluation criteria. The evaluation results are indicated in tables 1 to 3.

(Evaluation Criteria)

A: Required drying energy is less than 20° C.xsec.

B: Required drying energy is 20° C.xsec. or more and less than 35° C.xsec.

C: Required drying energy is 35° C.xsec. or more and less than 50° C.xsec.

D: Required drying energy is 50° C.xsec. or more.

<Evaluation of Transfer Property (after Durability Test)>

A printing apparatus as a modification was fabricated by incorporating contact members of examples 1 to 14 and comparative examples 1 to 4 into an inkjet printing system (RICOH Pro VC60000, manufactured by Ricoh Co., Ltd.). At this time, a motor was installed as the driving source of the contact member, and the contact member was made rotatable independently of the conveying mechanism of the printing apparatus. Next, the contact member was rotated in the same direction as the conveying direction for 18 hours at 500 rpm, while conveying the recording medium (Lumi Art Gloss 200 gsm, manufactured by Stora Enso Oyj) that is a contacted member at tension of 40 N and 1 mpm, and the durability test was performed with respect to wear of the contact member and the contacted member.

The drying energy required to prevent transfer of the component derived from the liquid composition from the contacted member to the contact member from the contacted member was obtained by the same method as described above <Evaluation of transfer property (initial state)> by using the contact member after durability test, and was evaluated by using the same evaluation criteria. The evaluation results are indicated in tables 1 to 3.

<Evaluation of the Shape of the Transfer Portion>

In the aforementioned <Evaluation of transfer property (initial state)>, transfer was intentionally caused by setting the dry energy to 9.2° C.xsec. Next, an image with a void caused by the transfer was observed with a laser microscope (LEXT OLS4000 manufactured by Olympus Corporation) at a magnification of 20 times, and the observed image was subjected to binarization by a MaxEntropy algorithm and particle analysis by using analysis software (ImageJ manufactured by the National Institutes of Health) to calculate the area per void and the average value of the aspect ratio, and was evaluated by the following criteria. The evaluation results are indicated in tables 1 to 3.

(Evaluation Criteria of the Area of Void)

A: less than 1000 $\mu m^2$

B: 1000 $\mu m^2$ or more and less than 5000 $\mu m^2$

C: 5000 $\mu m^2$ or more and less than 10,000 $\mu m^2$

D: 10,000 $\mu m^2$ or more (Evaluation Criteria of the Aspect Ratio of Void)

A: 0.8 or more

B: 0.7 or more and less than 0.8

C: 0.6 or more and less than 0.7

D: less than 0.6

For reference, an image representing the shape of the transfer portion when the contact member of example 1 is used (see FIG. 7) and an image representing the shape of the transfer portion when the contact member of comparative example 1 is used (see FIG. 8) are illustrated.

<Evaluation of Heat Conductivity>

The surface of the contact members of examples 1 to 14 and comparative examples 1 to 4 was heated to a temperature of 140° C., and the sheet surface temperature after contact with the contacted member (Lumi Art Gloss 200 gsm, manufactured by Stora Enso Oyj) for 0.4 seconds was measured by a radiation thermometer, and was evaluated by the following criteria. More specifically, the paper surface temperature at a position of 12 mm from the start of the nip when the contacted member is conveyed at 30 mm/s was measured by a radiation thermometer. The evaluation results are indicated in tables 1 to 3.

(Evaluation Criteria)

A: 79° C. or more

B: 75° C. or more and less than 79° C.

C: 70° C. or more and less than 75° ° C.

D: less than 70° ° C.

TABLE 1

| | | | EXAMPLE | | | | | | |
|---|---|---|---|---|---|---|---|---|---|
| | | | 1 | 2 | 3 | 4 | 5 | 6 | 7 |
| BLASTING STEP | BLASTING AGENT | COUNT | 60 | 80 | 100 | 220 | 60 | 60 | 60 |
| | | CENTRAL PARTICLE DIAMETER (μm) | 256 | 181 | 128 | 60 | 280 | 303 | 300 |
| | | MATERIAL SHAPE | ALUMINA POLYGON | ALUMINA POLYGON | ALUMINA POLYGON | ALUMINA POLYGON | GLASS POLYGON | GLASS SPHERE | STAINLESS CYLINDER |
| | EJECTION PRESSURE (MPa) | | 0.3 | 0.3 | 0.3 | 0.3 | 0.3 | 0.3 | 0.3 |
| ALUMITE SULFATE PROCESSING STEP | | | PERFORM | PERFORM | PERFORM | PERFORM | PERFORM | PERFORM | PERFORM |
| FLUORINE RESIN PARTICLE ADHERING STEP | | | PERFORM | PERFORM | PERFORM | PERFORM | PERFORM | PERFORM | PERFORM |
| CONTACT AREA RATIO (%) | | | 14.7 | 27.5 | 34.2 | 98.0 | 16.0 | 17.0 | 16.2 |
| ROOT SQUARE MEAN HEIGHT Sq (μm) | | | 5.84 | 4.75 | 4.04 | 1.33 | 6.62 | 5.92 | 6.32 |
| Ra (Min.) | | | 3.43 | 2.84 | 1.97 | 0.54 | 3.55 | 2.87 | 3.33 |
| Ra (90°) | | | 4.05 | 3.47 | 2.53 | 0.60 | 4.51 | 3.47 | 4.21 |
| ORTHOGONAL LINE ROUGHNESS RATIO (Ra (Min.)/Ra (90°)) | | | 0.85 | 0.82 | 0.78 | 0.91 | 0.79 | 0.83 | 0.79 |
| AMOUNT OF ELEMENTAL FLUORINE (atm %) | | | 17.2 | 17.3 | 17.5 | 16.8 | 17.3 | 17.9 | 16.2 |
| THICKNESS OF SUPPORT LAYER (μm) | | | 29.5 | 30.0 | 29.9 | 30.0 | 30.0 | 31.3 | 31.0 |
| VICKERS HARDNESS ($kgf/mm^2$) | | | 430 | 440 | 429 | 430 | 440 | 450 | 445 |
| TRANSFER PROPERTY (INITIAL STATE) | DRYING ENERGY (° C. · sec.) | | 17.2 | 27.6 | 46.0 | 46.0 | 17.2 | 27.6 | 17.2 |
| | EVALUATION RESULT | | A | B | C | C | A | B | A |
| TRANSFER PROPERTY (AFTER DURABILITY TEST) | DRYING ENERGY (° C. · sec.) | | 17.2 | 27.6 | 46.0 | 46.0 | 17.2 | 27.6 | 17.2 |
| | EVALUATION RESULT | | A | B | C | C | A | B | A |
| TRANSFER SHAPE | AREA ($μm^2$) | | 5300 | 3200 | 950 | 800 | 2300 | 5500 | 4900 |
| | EVALUATION RESULT | | C | B | A | A | B | C | B |
| | ASPECT RATIO | | 0.71 | 0.82 | 0.88 | 0.92 | 0.78 | 0.78 | 0.73 |
| | EVALUATION RESULT | | B | A | A | A | B | B | B |
| HEAT TRANSFER PROPERTY | PAPER SURFACE TEMPERATURE (° C.) | | 79.0 | 79.4 | 79.8 | 80.0 | 79.0 | 79.0 | 79.0 |
| | EVALUATION RESULT | | A | A | A | A | A | A | A |

TABLE 2

| | | | EXAMPLE | | | | | | |
|---|---|---|---|---|---|---|---|---|---|
| | | | 8 | 9 | 10 | 11 | 12 | 13 | 14 |
| BLASTING STEP | BLASTING AGENT | COUNT | 60 | 80 | 40 | 20 | 60 | 60 | 60 |
| | | CENTRAL PARTICLE DIAMETER (μm) | 303 | 215 | 428 | 855 | 256 | 256 | 256 |
| | | MATERIAL SHAPE | GLASS SPHERE | GLASS SPHERE | GLASS SPHERE | GLASS SPHERE | ALUMINA POLYGON | ALUMINA POLYGON | ALUMINA POLYGON |
| | EJECTION PRESSURE (MPa) | | 0.2 | 0.3 | 0.3 | 0.3 | 0.3 | 0.3 | 0.3 |

TABLE 2-continued

| | | EXAMPLE | | | | | | |
|---|---|---|---|---|---|---|---|---|
| | | 8 | 9 | 10 | 11 | 12 | 13 | 14 |
| ALUMITE SULFATE PROCESSING STEP | | PERFORM | PERFORM | PERFORM | PERFORM | PERFORM | PERFORM | PERFORM |
| FLUORINE RESIN PARTICLE ADHERING STEP | | PERFORM | PERFORM | PERFORM | PERFORM | DO NOT PERFORM | PERFORM | PERFORM |
| CONTACT AREA RATIO (%) | | 34.0 | 19.9 | 36.4 | 19.0 | 14.7 | 14.8 | 14.6 |
| ROOT SQUARE MEAN HEIGHT Sq (μm) | | 7.32 | 6.16 | 6.97 | 10.18 | 5.84 | 5.88 | 5.73 |
| Ra (Min.) | | 1.57 | 3.37 | 3.49 | 3.74 | 3.43 | 3.98 | 3.77 |
| Ra (90°) | | 2.11 | 4.12 | 4.81 | 5.12 | 4.05 | 4.35 | 4.75 |
| ORTHOGONAL LINE ROUGHNESS RATIO (Ra (Min.)/Ra (90°)) | | 0.74 | 0.82 | 0.73 | 0.73 | 0.85 | 0.91 | 0.79 |
| AMOUNT OF ELEMENTAL FLUORINE (atm %) | | 17.3 | 17.8 | 18.2 | 17.3 | 0 | 17.0 | 17.5 |
| THICKNESS OF SUPPORT LAYER (μm) | | 29.0 | 30.0 | 29.5 | 32.1 | 30.0 | 18.5 | 45.0 |
| VICKERS HARDNESS ($kgf/mm^2$) | | 451 | 442 | 456 | 435 | 429 | 420 | 435 |
| TRANSFER PROPERTY (INITIAL STATE) | DRYING ENERGY (° C. · sec.) | 17.2 | 27.6 | 17.2 | 34.4 | 48.2 | 17.2 | 17.2 |
| | EVALUATION RESULT | A | B | A | B | C | A | A |
| TRANSFER PROPERTY (AFTER DURABILITY TEST) | DRYING ENERGY (° C. · sec.) | 17.2 | 27.6 | 17.2 | 34.4 | 48.2 | 34.4 | 17.2 |
| | EVALUATION RESULT | A | B | A | B | C | B | A |
| TRANSFER SHAPE | AREA ($\mu m^2$) | 4800 | 3000 | 2000 | 5000 | 6300 | 5200 | 5300 |
| | EVALUATION RESULT | B | B | B | C | C | C | C |
| | ASPECT RATIO | 0.72 | 0.78 | 0.66 | 0.75 | 0.77 | 0.72 | 0.73 |
| | EVALUATION RESULT | B | B | C | B | B | B | B |
| HEAT TRANSFER PROPERTY | PAPER SURFACE TEMPERATURE (° C.) | 79.0 | 79.2 | 80.0 | 77.0 | 79.0 | 79.2 | 77.0 |
| | EVALUATION RESULT | A | A | A | B | A | A | B |

TABLE 3

| | | | COMPARATIVE EXAMPLE | | | |
|---|---|---|---|---|---|---|
| | | | 1 | 2 | 3 | 4 |
| BLASTING STEP | BLASTING AGENT | COUNT | NONE | NONE (LATHING PROCESS) | NONE (LATHING PROCESS) | 60 |
| | | CENTRAL PARTICLE DIAMETER (μm) | | | | 256 |
| | | MATERIAL | | | | ALUMINA |
| | | SHAPE | | | | POLYGON |
| | EJECTION PRESSURE (MPa) | | | | | 0.3 |
| ALUMITE SULFATE PROCESSING STEP | | | PERFORM | PERFORM | PERFORM | DO NOT PERFORM |
| FLUORINE RESIN PARTICLE ADHERING STEP | | | PERFORM | PERFORM | PERFORM | PERFORM |
| CONTACT AREA RATIO (%) | | | 99.8 | 83.6 | 30.2 | 11.8 |
| ROOT SQUARE MEAN HEIGHT Sq (μm) | | | 0.62 | 6.87 | 15.20 | 6.80 |
| Ra (Min.) | | | 0.24 | 0.05 | 0.38 | 3.27 |
| Ra (90°) | | | 0.61 | 0.42 | 10.28 | 4.66 |
| ORTHOGONAL LINE ROUGHNESS RATIO (Ra (Min.)/Ra (90°)) | | | 0.39 | 0.12 | 0.04 | 0.70 |
| AMOUNT OF ELEMENTAL FLUORINE (atm %) | | | 17.2 | 17.8 | 17.0 | 17.3 |
| THICKNESS OF SUPPORT LAYER (μm) | | | 30.5 | 29.5 | 30.0 | 0 |
| VICKERS HARDNESS ($kgf/mm^2$) | | | 430 | 445 | 450 | 113 |
| TRANSFER PROPERTY (INITIAL STATE) | DRYING ENERGY (° C. · sec.) | | 55.2 | 69.2 | 92.0 | 27.6 |
| | EVALUATION RESULT | | D | D | D | B |
| TRANSFER PROPERTY (AFTER DURABILITY TEST) | DRYING ENERGY (° C. · sec.) | | 55.2 | 69.2 | 92.0 | 69.2 |
| | EVALUATION RESULT | | D | D | D | D |
| TRANSFER SHAPE | AREA ($\mu m^2$) | | 27000 | 18000 | 21000 | 7200 |
| | EVALUATION RESULT | | D | D | D | C |
| | ASPECT RATIO | | 0.59 | 0.43 | 0.33 | 0.77 |
| | EVALUATION RESULT | | C | D | D | B |

TABLE 3-continued

| | | COMPARATIVE EXAMPLE | | | |
|---|---|---|---|---|---|
| | | 1 | 2 | 3 | 4 |
| HEAT TRANSFER PROPERTY | PAPER SURFACE TEMPERATURE (° C.) | 80.0 | 79.0 | 69.0 | 80.0 |
| | EVALUATION RESULT | A | A | D | A |

Examples of embodiments of the present invention are as follows.

<1> A contact member configured to contact a contacted member to which a liquid composition is applied, including a surface layer (A) configured to contact the contacted member, wherein the surface layer (A) includes a support layer including alumite sulfate, the surface layer (A) has a root mean square height Sq of 1.0 μm or more, and the surface layer (A) has an orthogonal line roughness ratio of 0.7 or more.

<2> The contact member according to <1>, wherein the root mean square height Sq of the surface layer (A) is 10.0 μm or less.

<3> The contact member according to <1> or <2>, wherein a ratio of an area where the surface layer (A) and the contacted member contact each other, with respect to an area of the surface layer (A), is 10% or more and 90% or less.

<4> The contact member according to any one of <1> to <3>, wherein the surface layer (A) includes fluorine resin particles adhering to the support layer.

<5> The contact member according to any one of <1> to <4>, wherein an amount of elemental fluorine in the surface layer (A) is 5.0 atm % or more.

<6> The contact member according to any one of <1> to <5>, wherein the contact member has a Vickers hardness of 400 Hv or more and 500 Hv or less.

<7> The contact member according to any one of <1> to <6>, wherein an average thickness of the support layer is 20 μm or more and 40 μm or less.

<8> The contact member according to any one of <1> to <7>, wherein the contact member includes a base material and the surface layer (A) provided on the base material, wherein the base material includes aluminum.

<9> The contact member according to any one of <1> to <8>, wherein the contact member is shaped as a roller having a diameter of 50 mm or more and 600 mm or less.

<10> The contact member according to any one of <1> to <9>, wherein the contact member includes a heating unit configured to apply heat to the contacted member via the surface layer (A).

<11> The contact member according to any one of <1> to <10>, wherein the surface layer (A) has a temperature of 70° C. or more and 260° C. or less.

<12> The contact member according to any one of <1> to <11>, wherein the contacted member is a recording medium.

<13> A drying apparatus including the contact member according to any one of <1> to <12>, wherein the drying apparatus is configured to dry the contacted member to which the liquid composition is applied.

<14> A printing apparatus including a liquid composition applying unit configured to apply the liquid composition to the contacted member; and the contact member according to any one of <1> to <12>.

<15> The printing apparatus according to <14>, further including a contacted member supplying unit configured to supply the contacted member; a contacted member retrieving unit configured to retrieve the contacted member; and a conveying path on which the contacted member supplied from the contacted member supplying unit is conveyed until being retrieved by the contacted member retrieving unit, wherein a length of the contacted member in a conveying direction is longer than a length of the conveying path.

<16> The printing apparatus according to <14> or <15>, wherein a speed of conveying the contacted member is 50 m/min or more.

<17> A printing method including applying the liquid composition to the contacted member; and bringing the contact member according to any one of <1> to <12> and the contacted member to which the liquid composition is applied, in contact with each other.

According to the contact member according to any one of <1> to <12>, the drying apparatus according to <13>, the printing apparatus according to <14> to <16>, and the printing method according to <17>, various problems in the conventional technology can be solved and the object of the present invention can be achieved.

REFERENCE SIGNS LIST

1 contacted member supplying unit
2 liquid composition applying unit
3 heating member
4 contact member
6 contacted member retrieving unit
7 contacted member
8 conveying path
**9*a*** end portion where the contacted member is separated from the contact member
**9*b*** end portion where the contacted member is separated from the contact member
50 drying apparatus
100 printing apparatus The present application is based on and claims priority of Japanese Priority Application No. 2021-071698 filed on Apr. 21, 2021, and Japanese Priority Application No. 2022-028908 filed on Feb. 28, 2022, the entire contents of which are hereby incorporated herein by reference.

The invention claimed is:

1. A contact member configured to contact a contacted member to which a liquid composition is applied, the contact member comprising:

a surface layer (A) configured to contact the contacted member, wherein the surface layer (A) includes a support layer including alumite sulfate, the surface layer (A) has a root mean square height Sq of 1.0 μm or more, and the surface layer (A) has an orthogonal line roughness ratio in a range between 0.8~0.9.

2. The contact member according to claim 1, wherein the root mean square height Sq of the surface layer (A) is 10.0 μm or less.

3. The contact member according to claim 1, wherein a ratio of an area where the surface layer (A) and the contacted member contact each other, with respect to an area of the surface layer (A), is 10% or more and 90% or less.

4. The contact member according to claim 1, wherein the surface layer (A) includes fluorine resin particles adhering to the support layer.

5. The contact member according to claim 1, wherein an amount of elemental fluorine in the surface layer (A) is 5.0 atm % or more.

6. The contact member according to claim 1, wherein the contact member has a Vickers hardness of 400 Hv or more and 500 Hv or less.

7. The contact member according to claim 1, wherein an average thickness of the support layer is 20 μm or more and 40 μm or less.

8. The contact member according to claim 1, wherein the contact member includes a base material and the surface layer (A) provided on the base material, and the base material includes aluminum.

9. The contact member according to claim 1, wherein the contact member is shaped as a roller having a diameter of 50 mm or more and 600 mm or less.

10. The contact member according to claim 1, wherein the contact member includes a heating unit configured to apply heat to the contacted member via the surface layer (A).

11. The contact member according to claim 1, wherein the surface layer (A) has a temperature of 70° C. or more and 260° C. or less.

12. A drying apparatus, comprising:

the contact member according to claim 1, wherein the drying apparatus is configured to dry the contacted member to which the liquid composition is applied.

13. A printing apparatus, comprising:

a liquid composition applying unit configured to apply the liquid composition to the contacted member; and the contact member according to claim 1.

14. The printing apparatus according to claim 13, further comprising:

a contacted member supplying unit configured to supply the contacted member;

a contacted member retrieving unit configured to retrieve the contacted member; and a conveying path on which the contacted member supplied from the contacted member supplying unit is conveyed until being retrieved by the contacted member retrieving unit, wherein a length of the contacted member in a conveying direction is longer than a length of the conveying path.

15. The printing apparatus according to claim 13, wherein a speed of conveying the contacted member is 50 m/min or more.

* * * * *